(12) United States Patent
Ko et al.

(10) Patent No.: US 11,570,443 B2
(45) Date of Patent: Jan. 31, 2023

(54) METHOD AND APPARATUS FOR VIDEO SIGNAL PROCESSING USING SUB-BLOCK BASED MOTION COMPENSATION

(71) Applicant: WILUS INSTITUTE OF STANDARDS AND TECHNOLOGY INC., Seongnam-si (KR)

(72) Inventors: Geonjung Ko, Seoul (KR); Juhyung Son, Uiwang-si (KR); Dongcheol Kim, Suwon-si (KR); Jinsam Kwak, Anyang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

(21) Appl. No.: 16/964,967

(22) PCT Filed: Jan. 25, 2019

(86) PCT No.: PCT/KR2019/001119
§ 371 (c)(1),
(2) Date: Jul. 24, 2020

(87) PCT Pub. No.: WO2019/147079
PCT Pub. Date: Aug. 1, 2019

(65) Prior Publication Data
US 2021/0051329 A1  Feb. 18, 2021

(30) Foreign Application Priority Data

Jan. 25, 2018 (KR) .................. 10-2018-0009657
Feb. 28, 2018 (KR) .................. 10-2018-0024881
Mar. 1, 2018 (KR) .................. 10-2018-0024956

(51) Int. Cl.
*H04N 19/105* (2014.01)
*H04N 19/139* (2014.01)
(Continued)

(52) U.S. Cl.
CPC ......... *H04N 19/139* (2014.11); *H04N 19/105* (2014.11); *H04N 19/176* (2014.11); *H04N 19/521* (2014.11)

(58) Field of Classification Search
CPC ............... H04N 19/176; H04N 19/521; H04N 19/105; H04N 19/139
See application file for complete search history.

(56) References Cited

U.S. PATENT DOCUMENTS 10,448,010 B2   10/2019 Chen et al.
10,659,803 B2   5/2020 Chen et al.
(Continued)

FOREIGN PATENT DOCUMENTS

EP   3422720 A1 *  1/2019  ............. H04N 19/52
JP   5477340 B2    4/2014
(Continued)

OTHER PUBLICATIONS

International Search Report & Written Opinion of the International Searching Authoriity_PCT/KR2019/001119_dated May 17, 2019.
(Continued)

*Primary Examiner* — Anner N Holder

(57) ABSTRACT

A video signal processing method and apparatus for encoding or decoding a video signal is disclosed. More particularly, a video signal processing method and a video signal processing apparatus using the same are disclosed, wherein a method for processing a video signal comprises the steps of: obtaining a set of control point motion vectors for prediction of a current block; obtaining the motion vector of each sub-block of the current block using control point motion vectors of the set of control point motion vectors; obtaining a predictor of the each sub-block of the current block using the motion vectors of the each sub-block; obtaining a predictor of the current block by combining
(Continued)

(a)

(b)

predictors of the each sub-block; and restoring the current block using the predictor of the current block.

6 Claims, 25 Drawing Sheets

(51) Int. Cl.
*H04N 19/176* (2014.01)
*H04N 19/513* (2014.01)

(56) References Cited

U.S. PATENT DOCUMENTS

| | | | |
|---|---|---|---|
| 2017/0374379 A1* | 12/2017 | Chen | H04N 19/513 |
| 2018/0139468 A1* | 5/2018 | Lin | H04N 19/513 |
| 2018/0192069 A1* | 7/2018 | Chen | H04N 19/52 |
| 2019/0028731 A1* | 1/2019 | Chuang | H04N 19/109 |
| 2019/0058896 A1* | 2/2019 | Huang | H04N 19/159 |
| 2019/0110061 A1* | 4/2019 | Park | H04N 19/513 |
| 2019/0158870 A1* | 5/2019 | Xu | H04N 19/51 |
| 2019/0182503 A1* | 6/2019 | Tsai | H04N 19/139 |
| 2019/0342547 A1* | 11/2019 | Lee | H04N 19/46 |
| 2020/0288163 A1* | 9/2020 | Poirier | H04N 19/147 |
| 2020/0288166 A1* | 9/2020 | Robert | H04N 19/147 |

FOREIGN PATENT DOCUMENTS

| | | | |
|---|---|---|---|
| KR | 101536540 B1 | 7/2015 | |
| KR | 20170094535 A | 8/2017 | |
| KR | 20170131448 A | 11/2017 | |
| KR | 20180005119 A | 1/2018 | |

OTHER PUBLICATIONS

Office Action from Indian Patent Office for Indian Patent Application No. 202027032528 dated Jun. 28, 2021.

* cited by examiner

*FIG.31*

X: Interpolated values

METHOD AND APPARATUS FOR VIDEO SIGNAL PROCESSING USING SUB-BLOCK BASED MOTION COMPENSATION

CROSS-REFERENCE TO RELATED APPLICATIONS

This application is a National Stage Entry of PCT International Application No. PCT/KR 2019/001119, which was filed on Jan. 25, 2019, and which claims priority from and the benefit of Korean Patent Application 10-2018-0009657, filed with the Korean Intellectual Property Office on Jan. 25, 2018, Korean Patent Application 10-2018-0024881, filed with the Korean Intellectual Property Office on Feb. 28, 2018, and Korean Patent Application 10-2018-0024956, filed with the Korean Intellectual Property Office on Mar. 1, 2018, the disclosure of which are hereby incorporated by reference in its entirety.

TECHNICAL FIELD

The present invention relates to a method and apparatus for processing a video signal using subblock-based motion compensation, and more particularly, to a video signal processing method and apparatus for predicting a current block using a plurality of control point motion vectors.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

The present invention has an object to increase the coding efficiency of a video signal.

In addition, the present invention has an object to efficiently perform motion compensation for zoom in/out, rotation, and other irregular movements as well as conventional translational movements.

Technical Solution

In order to solve the above problems, the present invention provides the following video signal processing apparatus and method for processing a video signal.

First, according to an embodiment of the present invention, in relation to a method for processing a video signal processing comprising: obtaining a control point motion vector set for predicting a current block, wherein the control point motion vector set includes at least two control point motion vectors respectively corresponding to specific control points of the current block; obtaining a motion vector of each subblock of the current block using control point motion vectors of the control point motion vector set; obtaining a predictor of each subblock of the current block using the motion vector of each subblock; obtaining a predictor of the current block by combining the predictor of each subblock; and reconstructing the current block using the predictor of the current block, wherein the obtaining of the control point motion vector set comprises: obtaining an indicator indicating a motion vector information set to be referenced to derive a motion vector of each subblock of the current block; and obtaining control point motion vectors of the control point motion vector set with reference to the motion vector information set indicated by the indicator.

In addition, according to an embodiment of the present invention, in relation to a video signal processing apparatus, the apparatus includes a processor obtain a control point motion vector set for predicting a current block, wherein the control point motion vector set includes at least two control point motion vectors respectively corresponding to specific control points of the current block; obtain a motion vector of each subblock of the current block using control point motion vectors of the control point motion vector set; obtain a predictor of each subblock of the current block using the motion vector of each subblock; obtain a predictor of the current block by combining the predictor of each subblock; and reconstruct the current block using the predictor of the current block, wherein the processor obtains an indicator indicating a motion vector information set to be referenced to derive a motion vector of each subblock of the current block, and obtains control point motion vectors of the control point motion vector set with reference to the motion vector information set indicated by the indicator.

The obtaining of the control point motion vector set further comprises generating a candidate list composed of one or more motion vector information set candidates, wherein the control point motion vectors are obtained by referring to a motion vector information set selected based on the indicator in the candidate list.

The motion vector information set candidate includes a first candidate derived from control point motion vectors of a left neighboring block of the current block and a second candidate derived from control point motion vectors of an upper neighboring block of the current block.

The left neighboring block includes a block adjacent to a lower left corner of the current block, wherein the upper neighboring block includes a block adjacent to an upper left corner of the current block or a block adjacent to an upper right corner of the current block.

The motion vector information set candidate includes a third candidate composed of three control point motion vectors, and at least some of the three control point motion vectors are derived from motion vectors of neighboring blocks, wherein the third candidate composed of a first control point motion vector corresponding to an upper left corner of the current block, a second control point motion vector corresponding to an upper right corner of the current block, and a third control point corresponding to a lower left corner of the current block.

The third candidate includes a motion vector information set in which the first control point motion vector and the second control point motion vector are respectively derived from motion vectors of neighboring blocks, and the third control point motion vector is calculated based on the first control point motion vector and the second control point motion vector.

The first control point motion vector is derived from a motion vector of a block adjacent to an upper left corner of the current block, and the second control point motion vector is derived from a motion vector of a block adjacent to an upper right corner of the current block.

The motion vector information set candidate includes a fourth candidate composed of two control point motion vectors derived from motion vectors of neighboring blocks, wherein the fourth candidate includes: a motion vector information set composed of a first control point motion vector corresponding to an upper left corner of the current block and a second control point motion vector corresponding to an upper right corner of the current block; and a motion vector information set composed of a first control point motion vector corresponding to an upper left corner of the current block and a third control point motion vector corresponding to a lower left corner of the current block.

The indicator indicates location information of neighboring block(s) referenced to derive a motion vector of each subblock of the current block among a plurality of neighboring blocks of the current block.

Advantageous Effects

According to an embodiment of the present invention, coding efficiency of a video signal may be increased.

Further, according to an embodiment of the present invention, motion compensation for various types of motions can be efficiently performed using subblock-based motion compensation.

Further, according to an embodiment of the present invention, a set of motion vector information referenced to obtain motion vectors for each subblock may be efficiently signaled.

BRIEF DESCRIPTION OF THE DRAWINGS

FIG. 31 shows a filter shape according to a further embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
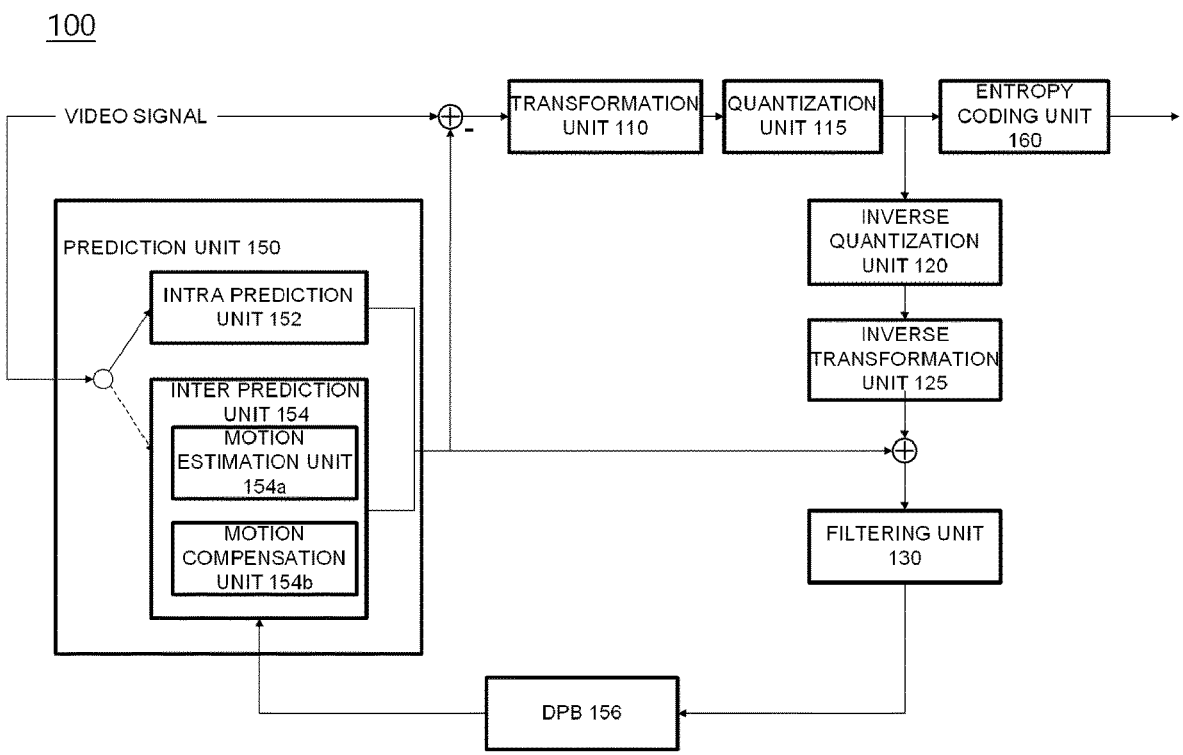
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
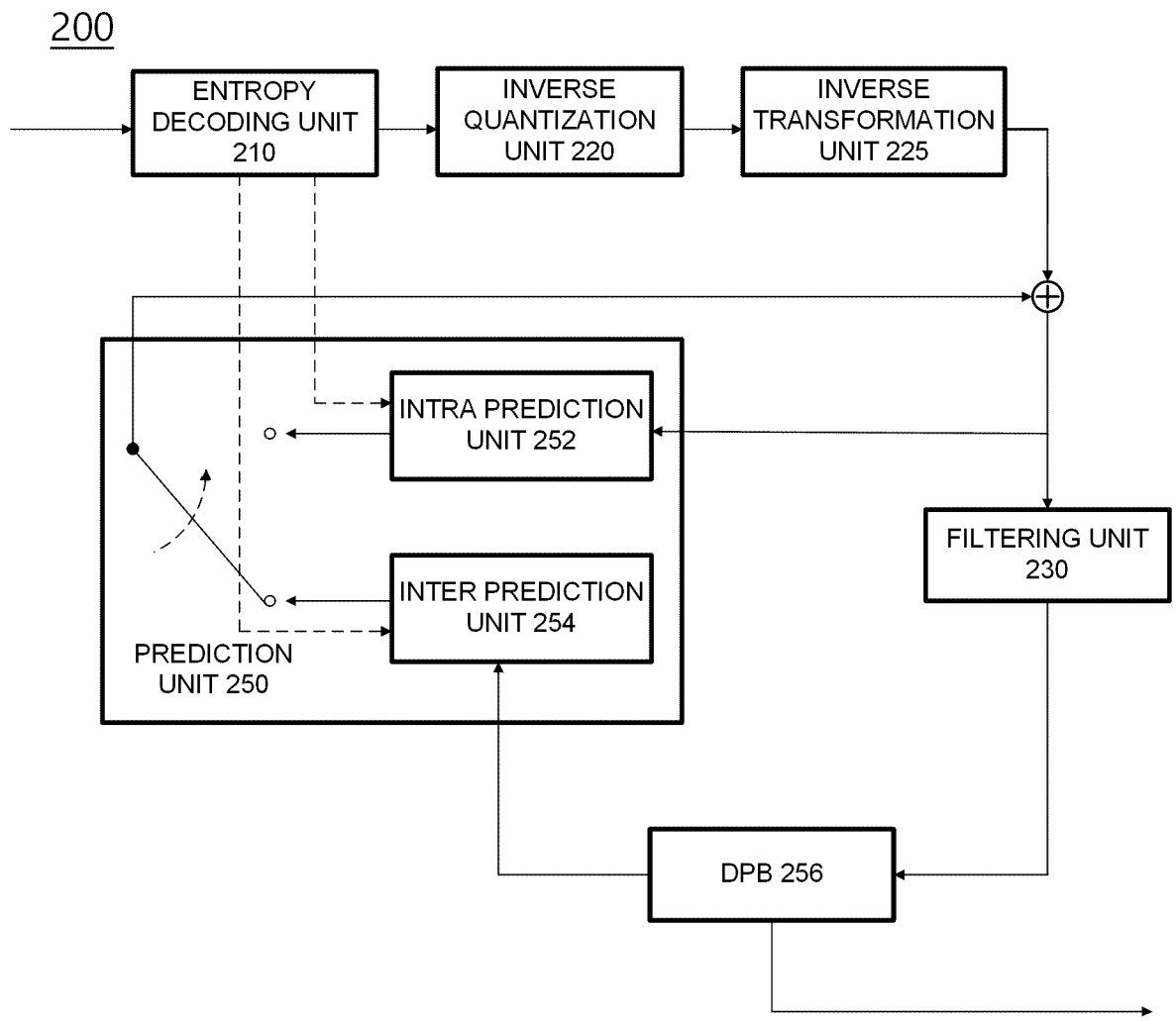
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a predictor unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the prediction value obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction, is called an intra picture or an I picture (or, tile/slice), and a picture (or, tile/slice) that can perform both intra prediction and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this specification, samples and sample values may refer to pixels and pixel values, respectively. According to an embodiment, the reference samples may be samples adjacent to the left boundary line of the current block and/or samples adjacent to the upper boundary line. According to another embodiment, the reference samples may be samples adjacent within a predetermined distance from the left boundary of the current block and/or samples adjacent within a predetermined distance from the upper boundary of the current block. The intra prediction unit 252 determines reference samples based on the intra prediction mode of the current block, and predicts samples of the current block using the determined reference samples. The intra prediction mode of the current block may be determined through separately signaled indexes (e.g., intra prediction mode index, MPM index, etc.). When the MPM index is signaled, the intra prediction unit 252 may perform intra prediction using an intra prediction mode applied to neighboring blocks or a predetermined intra prediction mode. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously using motion information.

The reconstructed video picture is generated by adding the predictor value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
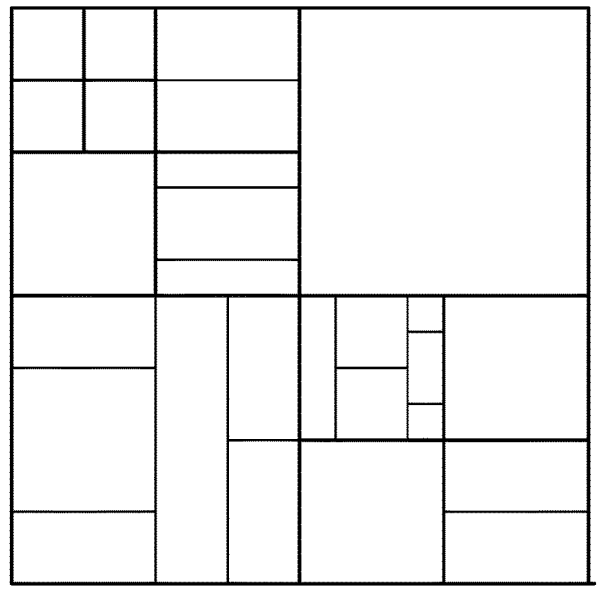
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If the coding unit is not too large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
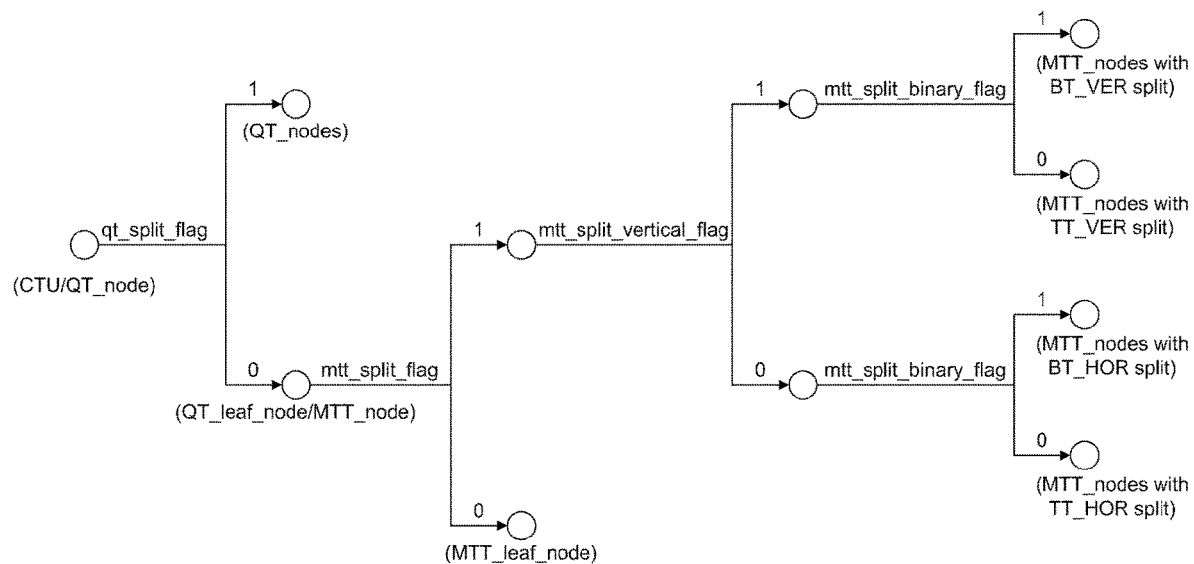
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
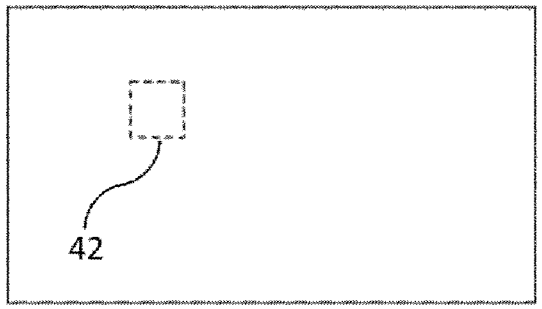
FIG. 5 shows inter prediction according to an embodiment of the present invention.
Figure 5:
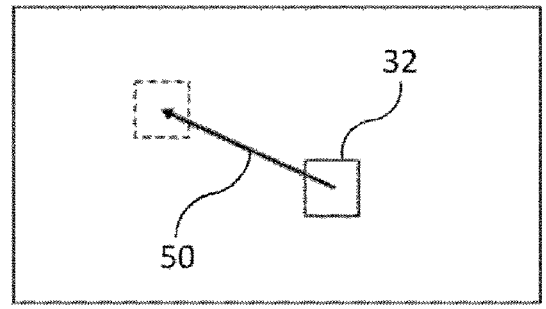

FIG. 5 shows inter prediction according to an embodiment of the present invention. As described above, the decoder predicts the current block by referring to reconstructed samples of another decoded picture. Referring to FIG. 5, the decoder obtains a reference block 42 in the reference picture based on the motion information of the current block 32. In this case, the motion information may include a reference picture index and a motion vector 50. The reference picture index indicates a reference picture of the current block in the reference picture list. In addition, the motion vector 50 represents an offset between the coordinate values of the current block 32 in the current picture and the coordinate values of the reference block 42 in the reference picture. The decoder obtains the predictor of the current block 32 based on the sample values of the reference block 42 and reconstructs the current block 32 using the predictor.

Meanwhile, according to an embodiment of the present invention, subblock-based motion compensation may be used. That is, the current block 32 is divided into a plurality of subblocks, and independent motion vectors may be used for each subblock. Therefore, each subblock in the current block 32 may be predicted using a different reference block. According to one embodiment, the subblock may have a predetermined size, such as 4×4 or 8×8. The decoder obtains a predictor of each subblock of the current block 32 using the motion vector of each subblock. The predictor of the current block 32 may be obtained by combining the predictors of each subblock, and the decoder may reconstruct the current block 32 using the predictor of the obtained current block 32.

According to an embodiment of the present invention, subblock-based motion compensation of various methods may be performed. Subblock-based motion compensation may include affine model-based motion compensation (hereinafter, affine motion compensation or affine motion prediction) and subblock-based temporal motion vector prediction (SbTMVP). Hereinafter, various embodiments of affine motion compensation and SbTMVP will be described with reference to each drawing.

Figure 6:
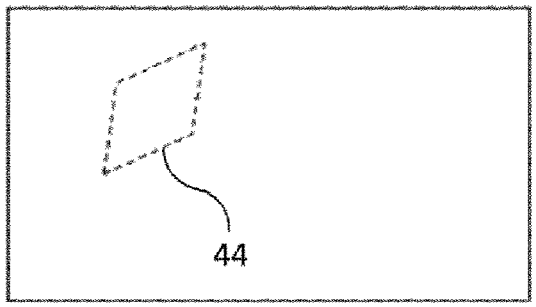
FIG. 6 shows affine motion compensation according to an embodiment of the present invention.
Figure 6:
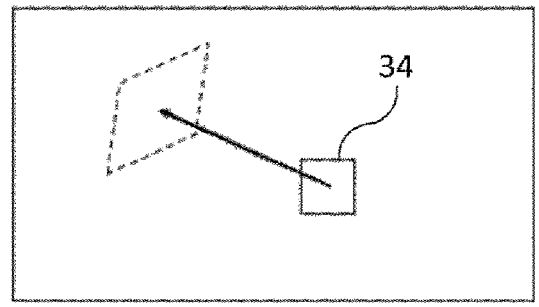

FIG. 6 shows affine motion compensation according to an embodiment of the present invention. According to the existing inter prediction method, since inter prediction is performed using only one motion vector for each L0 prediction and L1 prediction for the current block, it is optimized for prediction of translation motion. However, in order to efficiently perform motion compensation for zoom in/out, rotation, and other irregular movements, reference blocks 44 of various shapes and sizes need to be used.

Referring to FIG. 6, in affine motion compensation, prediction of the current block 34 may be performed using the reference block 44 having a different size, shape, and/or direction from the current block 34. That is, the reference block 44 may have a non-rectangular shape, and may be larger or smaller in size than the current block 34. The reference block 44 may be obtained by performing affine transformation on the current block 34. The affine transformation may include a six-parameter affine transformation using three control point motion vectors (CPMV) and a four-parameter affine transformation using two control point motion vectors. A specific embodiment relating to this will be described later.

Figure 7:
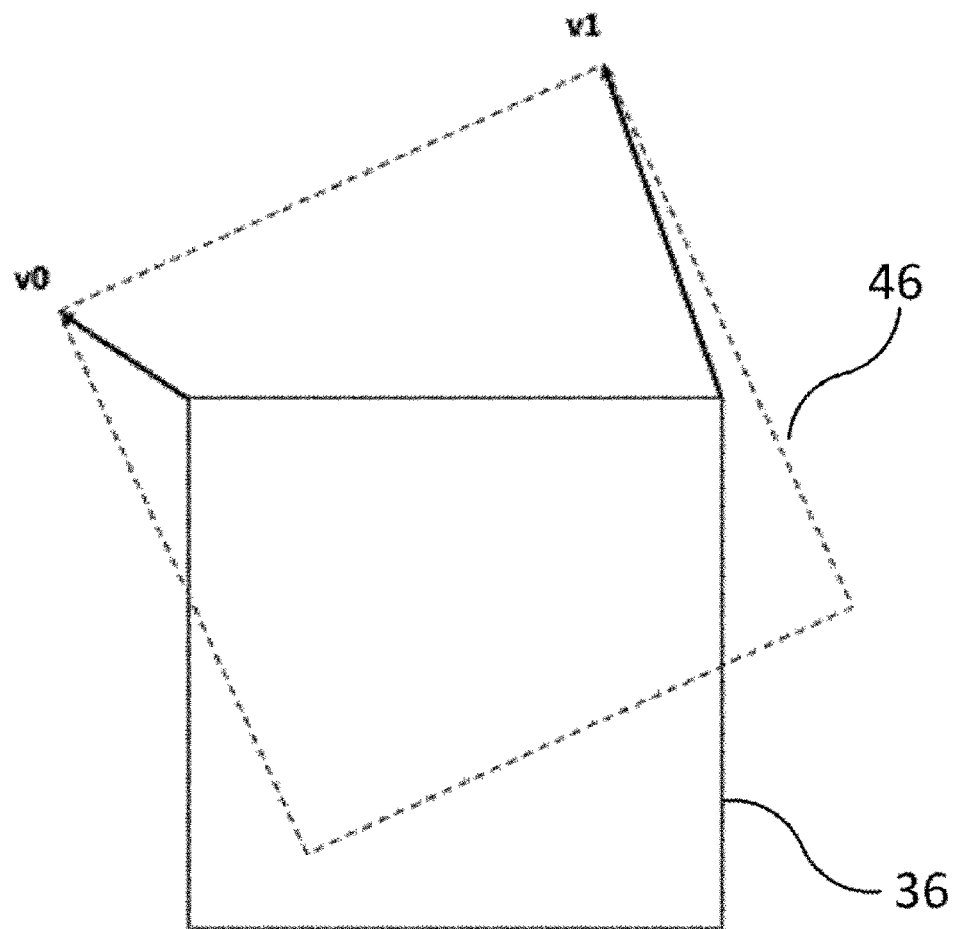
FIG. 7 shows an embodiment of a 4-parameter affine motion compensation method.

FIG. 7 shows an embodiment of a 4-parameter affine motion compensation method. In order to reduce the computational amount and signaling overhead of affine transformation, affine motion prediction may be performed using a predetermined number of control point motion vectors (CPMVs). The control point motion vector (CPMV) is a motion vector corresponding to a specific control point (or sample position) of the current block. The specific control point may include at least one of the edges of the current block. In an embodiment of the present invention, the CPMV corresponding to the upper left corner of the current block is referred to as v0 (or first CPMV), the CPMV corresponding to the upper right corner of the current block is referred to as v1 (or second CPMV), and the CPMV corresponding to the lower left corner of the current block is referred to as v2 (or third CPMV). A CPMV set including at least two CPMVs may be used for affine motion prediction.

According to the embodiment of FIG. 7, 4-parameter affine motion prediction may be performed using v0 and v1. The current block 36 indicated by a solid line may be predicted using the reference block 46 at a position indicated by a dotted line. Each sample of the current block 36 may be mapped to a different reference sample through affine transformation. More specifically, the motion vectors $(v_x, v_y)$ at the sample positions (x, y) of the current block 36 may be derived by Equation 1 below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{[Equation 1]}$$

Here, $(v_{0x}, v_{0y})$ is the first CPMV corresponding to the upper left corner of the current block 36, and $(v_{1x}, v_{1y})$ is the second CPMV corresponding to the upper right corner of the current block. In addition, w is the width of the current block 36.

Figure 8:
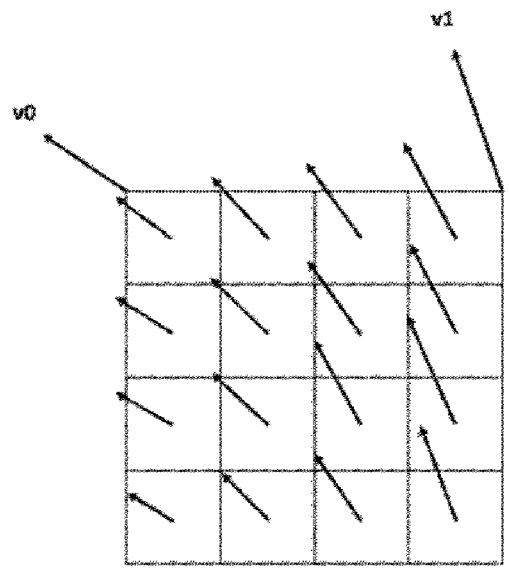
FIG. 8 shows an embodiment of a subblock-based affine motion compensation method.

FIG. 8 shows an embodiment of a subblock-based affine motion compensation method. As described above, when using the affine motion transform, motion vectors (i.e., motion vector fields) at each sample position of the current block may be derived. However, in order to reduce the amount of computation, subblock-based affine motion compensation may be performed according to an embodiment of the present invention. As shown in FIG. 8, the current block may include a plurality of subblocks, and a representative motion vector of each subblock is obtained based on the CPMV set. According to an embodiment, the representative motion vector of each subblock may be a motion vector corresponding to a sample position of the center of the subblock. According to a further embodiment, a motion vector with higher accuracy than a general motion vector may be used as a motion vector of a subblock. For this, a motion compensation interpolation filter may be applied.

The size of the subblock on which affine motion compensation is performed may be set in various ways. According to one embodiment of the present invention, the subblock may have a predetermined size, such as 4×4 or 8×8. According to another embodiment of the present invention, the size M×N of the subblock may be determined by Equation 2 below.

$$\begin{cases} M = clip3\left(4, w, \dfrac{w \times MvPre}{\max(\text{abs}(v_{2x} - v_{0x}), \text{abs}(v_{1y}v_{0y}))}\right) \\ N = clip3\left(4, h, \dfrac{h \times MvPre}{\max(\text{abs}(v_{2x} - v_{0x}), \text{abs}(v_{2y} - v_{0y}))}\right) \end{cases} \quad \text{[Equation 2]}$$

Here, w is the width of the current block, and MvPre is the fractional accuracy of the motion vector. $(v2_x, v2_y)$ is a third CPMV corresponding to the lower left corner of the current block, and may be calculated by Equation 1 according to an embodiment. max(a, b) is a function that returns the larger of a and b, and abs(x) is a function that returns the absolute value of x. In addition, clip3(x, y, z) is a function that returns x if z<x, y if z>y, and z otherwise.

The decoder obtains motion vectors of each subblock of the current block using CPMVs of the CPMV set. In addition, the decoder obtains the predictor of each subblock using the motion vector of each subblock, and combines the predictors of each subblock to obtain the predictor of the current block. The decoder may reconstruct the current block using the predictor of the obtained current block.

Figure 9:
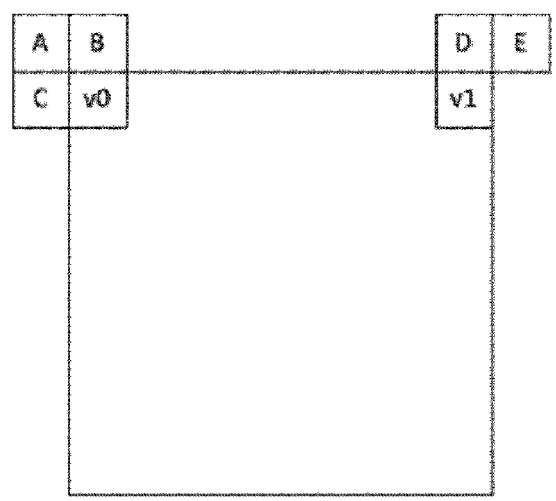
FIGS. 9 and 10 show embodiments of the invention for obtaining a control point motion vector set for prediction of the current block.
Figure 10:
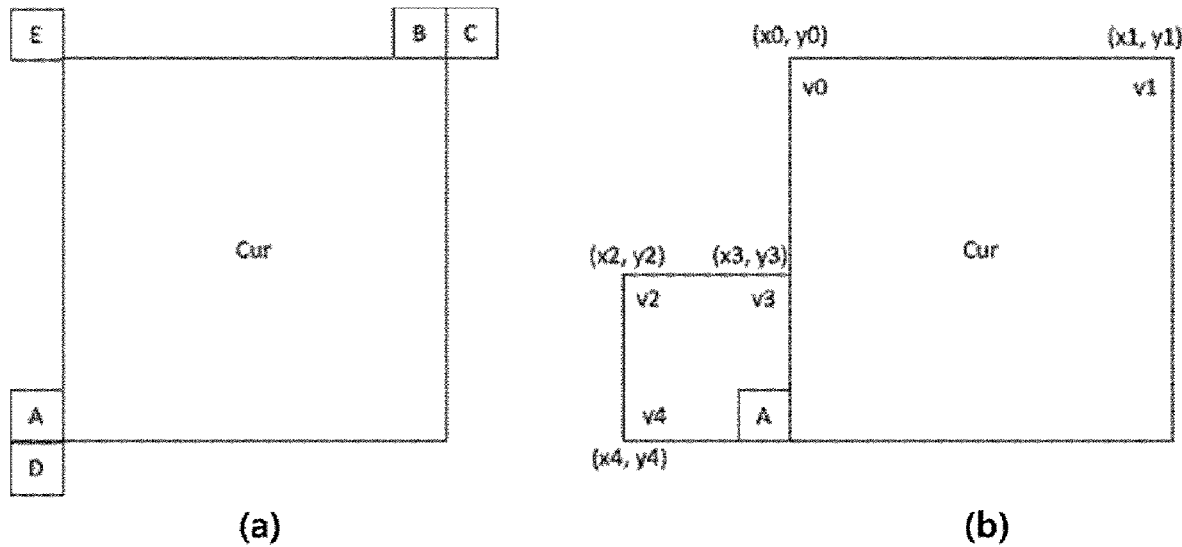

FIGS. 9 and 10 show embodiments of the present invention for obtaining a control point motion vector set for prediction of the current block. According to an embodiment of the present invention, a CPMV set for prediction of a current block may be obtained in various ways. More specifically, the CPMV set for prediction of the current block may be obtained by referring to a motion vector information set of one or more neighboring blocks.

In an embodiment of the present invention, motion vector information may indicate a motion vector of a corresponding block or a CPMV of a corresponding block. Also, the motion vector information set refers to a set of motion vector information of one or more blocks. The neighboring block may refer to a block including a predetermined neighboring position of the current block. In this case, the neighboring block may be a coding unit including a predetermined neighboring location or an area of a predetermined unit (e.g., 4×4, 8×8) including the neighboring location.

There may be multiple candidates that may be referenced to derive CPMVs of the current block. Therefore, information about a neighboring block to be referenced may be separately signaled to derive CPMVs of the current block. According to an embodiment of the present invention, an indicator indicating a set of motion vector information to be referenced may be signaled to derive a motion vector of each subblock of the current block.

The indicator may indicate a motion vector information set of neighboring block(s) to be referenced to derive a motion vector of each subblock of the current block. The decoder may obtain the indicator and may obtain each CPMV of the CPMV set for the current block by referring to the motion vector information set of the neighboring block(s) indicated by the indicator. According to a more specific embodiment, the decoder may generate a candidate list composed of one or more motion vector information set candidates. Each motion vector information set candidate constituting the candidate list is a motion vector set of neighboring blocks available to derive motion vector information of the current block. In this case, the indicator may be an index indicating any one motion vector information set from the candidate list. CPMVs of the current block may be obtained by referring to a motion vector information set selected based on the indicator (i.e., index) among candidate lists. Hereinafter, various embodiments of a motion vector information set candidate that may be included in a candidate list for deriving motion vector information (or CPMV set) of the current block will be described.

FIG. 9 shows an embodiment of obtaining the CPMV set of the current block. In the embodiment of FIG. 9, it is assumed that the CPMV set of the current block includes two CPMVs, that is, v0 and v1. According to an embodiment of the present invention, the CPMV of the current block may be derived from a motion vector of a neighboring block adjacent to the corresponding point. Referring to FIG. 9, v0 may be derived from a motion vector of one of neighboring blocks A, B, and C adjacent to the corresponding point, and v1 may be derived from a motion vector of one of neighboring blocks D and E adjacent to the corresponding point. When the motion vectors of neighboring blocks A, B, C, D, and E are called vA, vB, vC, vD, and vE, respectively, the motion vector information set that may be included in the candidate list may be derived as in Equation 3 below.

$$((v0,v1)|v0=\{vA,vB,vC\},v1=\{vD,vE\}) \qquad \text{Equation 31}$$

That is, a pair (v0, v1) composed of v0 selected from vA, vB, and vC and v1 selected from vD and vE may be obtained. In this case, v0 is derived from the motion vector of the block adjacent to the upper left corner of the current block, and v1 is derived from the motion vector of the block adjacent to the upper right corner of the current block. According to a further embodiment, motion vector scaling may be performed based on a picture order count (POC) of a current block, a POC of a reference picture of a neighboring block, and a POC of a reference picture of a current block.

A candidate list including the obtained motion vector information set candidate may be generated, and an indicator indicating one motion vector information set of the candidate list may be signaled. According to a further embodiment of the present invention, the candidate list may include a motion vector information set candidate for inter prediction of other methods. For example, the candidate list may include a motion vector information set candidate for subblock-based temporal motion vector prediction (SbTMVP).

The decoder may derive CPMVs of the current block based on the motion vector information set obtained from the candidate list. According to an embodiment, the decoder may perform affine merge prediction by using motion vectors of a motion vector information set obtained from a candidate list as a CPMV of a current block without a separate motion vector difference value. According to another embodiment, the decoder may obtain a separate motion vector difference value for CPMV of the current block. The decoder may obtain the CPMV of the current block by adding the motion vector of the motion vector information set obtained from the candidate list to the motion vector difference value. A flag or index indicating whether a decoder uses a separate motion vector difference value for affine motion compensation of a current block may be signaled separately.

FIG. 10 shows another embodiment of obtaining the CPMV set of the current block. According to another embodiment of the present invention, the CPMV of the current block may be derived from motion vector information of a neighboring block on which affine motion compensation is performed, that is, the CPMV or motion vector of a neighboring block. In this case, the neighboring block may include a left neighboring block of the current block and an upper neighboring block of the current block. Referring to FIG. 10(a), the left neighboring block includes blocks adjacent to the lower left corner of the current block, that is, the left block A and the lower left block D. Further, the upper neighboring block includes a block adjacent to the upper left corner of the current block, that is, the upper left block E, and blocks adjacent to the upper right corner of the current block, that is, the upper block B and the upper right block C. The decoder checks whether affine motion compensation is performed on neighboring blocks in a predetermined order.

When a neighboring block on which affine motion compensation is performed is found, the decoder obtains the CPMV set of the current block using the CPMV set (or motion vector) of the neighboring block. Referring to the embodiment of FIG. 10(b), the CPMV set of the left block A may be used to derive the CPMV set of the current block. That is, the CPMV set (v0, v1) of the current block may be obtained based on the CPMV set (v2, v3, v4) of the left block A.

According to an embodiment of the present invention, information on a neighboring block to be referenced may be separately signaled to derive the CPMV of the current block. In this case, the CPMV sets of neighboring blocks of the current block may be motion vector information set candidates that constitute the above-described candidate list according to a predetermined order. More specifically, the motion vector information set candidate may include a first candidate derived from CPMVs (or motion vectors) of the left neighboring block of the current block, and a second candidate derived from CPMVs (or motion vectors) of the upper neighboring block of the current block. In this case, the left neighboring block is a block adjacent to the lower left corner of the current block, and the upper neighboring block is a block adjacent to the upper left corner of the current block or a block adjacent to the upper right corner of the current block. A candidate list including the obtained motion vector information set candidate may be generated, and an indicator indicating one motion vector information set of the candidate list may be signaled. According to an embodiment, the indicator may indicate location information of neighboring block(s) referenced to derive a motion vector of each subblock of the current block. The decoder may obtain the CPMV set of the current block by referring to the CPMV set (or motion vector) of the neighboring block indicated by the indicator.

According to a further embodiment of the present invention, the CPMV of the current block may be derived based on the CPMV of the neighboring block close to the corresponding point. For example, v0 may be obtained by referring to CPMV of the left neighboring block, and v1 may be obtained by referring to CPMV of the upper neighboring block. Alternatively, v0 may be obtained by referring to CPMV of neighboring blocks A, D or E, and v1 may be obtained by referring to CPMV of neighboring blocks B or C.

Figure 11:
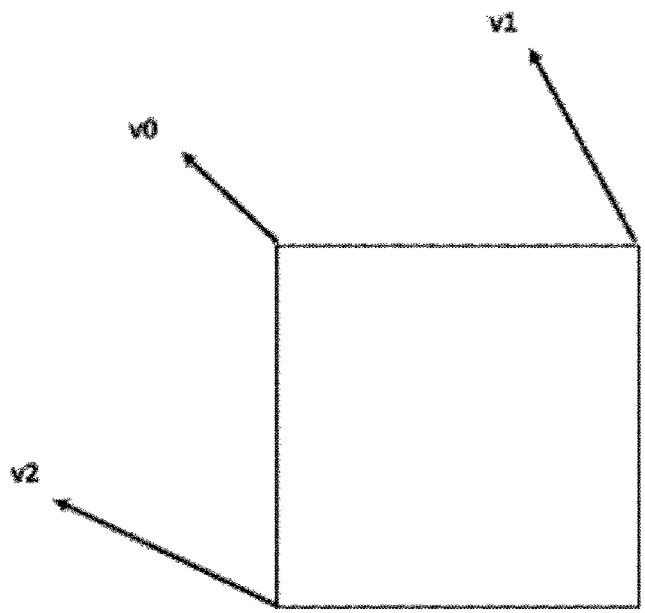
FIG. 11 shows an embodiment of a 6-parameter affine motion compensation method.

FIG. 11 shows an embodiment of a 6-parameter affine motion compensation method. For accurate prediction of more complex motions, affine motion prediction using three or more CPMVs may be performed. Referring to FIG. 11, 6-parameter affine motion compensation may be performed using three CPMVs, i.e., v0, v1, and v2. Here, v0 is a CPMV corresponding to the upper left corner of the current block, v1 is a CPMV corresponding to the upper right corner of the current block, and v2 is a CPMV corresponding to the lower left corner of the current block. The motion vector of each subblock of the current block may be calculated based on the v0, v1 and v2.

In the 6-parameter affine model, each CPMV may be obtained in different ways. Each CPMV may be explicitly signaled, derived from motion vector information of neighboring blocks, or calculated from other CPMVs of the current block. In a more specific embodiment, at least some of the three CPMVs are derived from motion vectors of neighboring blocks, and the remaining CPMVs may be calculated from other CPMVs of the current block. For example, v0 is derived from the motion vector of a block adjacent to the top-left corner of the current block, and v1 is derived from the motion vector of a block adjacent to the top-right corner of the current block, but v2 may be calculated based on v0 and v1. According to an embodiment, v2 may be determined based on a difference value between v0 and v1. The CPMVs obtained in such a way may constitute the motion vector information set candidate described above.

Figure 12:
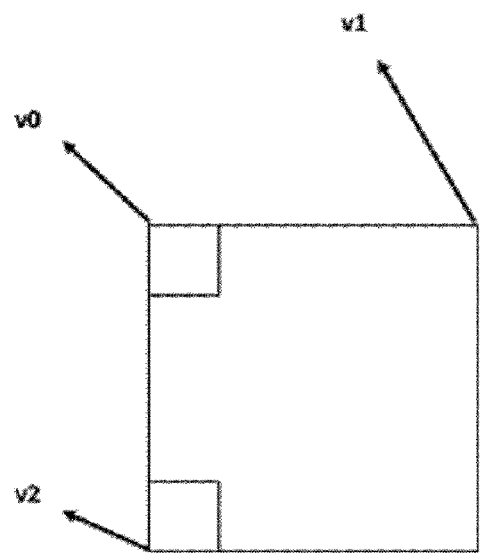
FIG. 12 shows another embodiment of obtaining a control point motion vector set for affine motion compensation.

FIG. 12 shows another embodiment of obtaining a control point motion vector set for affine motion compensation. According to another embodiment of the present invention, a motion vector information set candidate for affine motion compensation of a current block may be composed of two CPMVs selected from v0, v1, and v2. More specifically, the motion vector information set candidate may include a motion vector information set composed of v0 and v1, and a motion vector information set composed of v0 and v2. Each CPMV constituting the motion vector information set candidate is derived from the motion vector of the neighboring block. In this case, which set of a motion vector information set candidate composed of v0 and v1 and a motion vector information set candidate composed of v0 and v2 is referenced to perform affine motion compensation may be signaled through the above-mentioned indicator.

Figure 13:
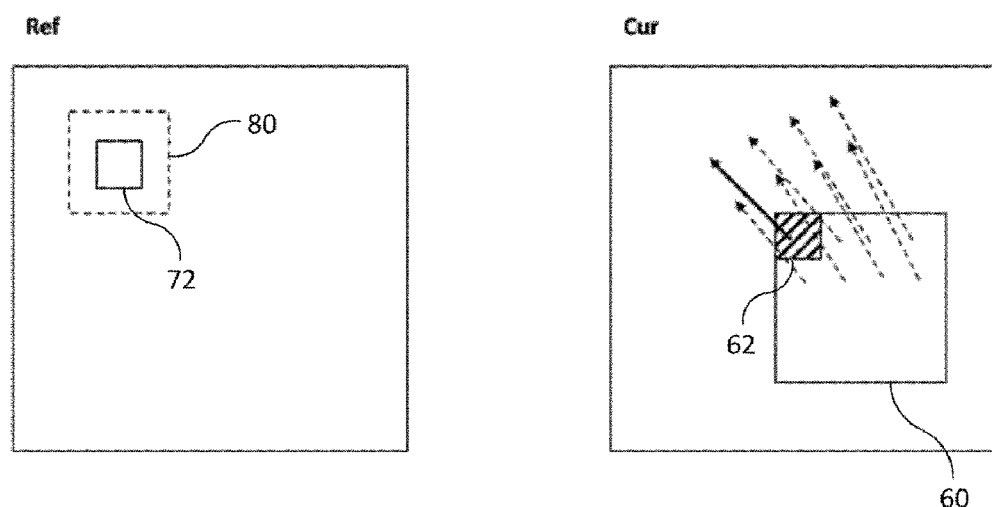
FIG. 13 shows an affine motion compensation method combined with local search.

According to a further embodiment of the present invention, different motion vector information sets may be used for each subblock in the current block. For example, v0 and v1 may be used to obtain a motion vector of a specific subblock, and v0 and v2 may be used to obtain a motion vector of another subblock. Which CPMV set is used to obtain a motion vector of each subblock may be determined based on the position of the subblock in the current block or the distance between the subblock and each CPMV FIG. 13 shows an affine motion compensation method combined with local search. When affine motion prediction is performed, since the CPMV is a motion vector corresponding to a specific control point (or sample position) of the current block, the motion vector of a subblock away from the corresponding position may be less accurate. In order to solve this, according to an embodiment of the present invention, after affine motion prediction is performed, local search may be additionally performed. The local search may be performed for each subblock. The local search is the process of finding a more accurate motion vector for the current subblock or a reference subblock more similar to the current subblock.

Referring to FIG. 13, affine motion prediction for the current block 60 is performed so that motion vectors of each subblock of the current block may be obtained as indicated by arrows. The reference subblock 72 of the current subblock 62 may be obtained based on the motion vector of the corresponding subblock obtained by affine motion prediction. In this case, the local search may be additionally performed within the predetermined range 80 from the reference subblock 72 to find a block more similar to the current subblock 62. The predetermined range 80 may be set in several steps. In addition, since applying a local search technique may require an additional amount of computation, a separate flag indicating whether to use a local search may be signaled.

The local search may be performed by various methods. For example, bilateral matching or template matching may be used for local search. Bilateral matching is a method of estimating a current block from two or more reference blocks of two or more reference pictures along a motion trajectory. Meanwhile, a specific embodiment of template matching will be described with reference to FIG. 14.

Figure 14:
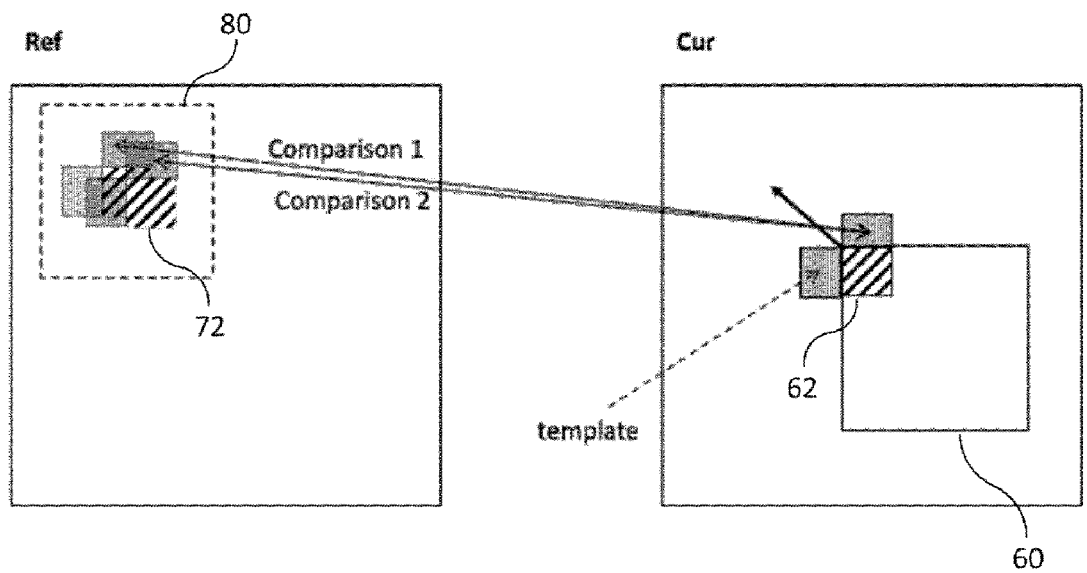
FIG. 14 shows a template matching method according to an embodiment of the present invention.

FIG. 14 shows a template matching method according to an embodiment of the present invention. Template matching may be performed to find a reference block similar to the current block or subblock. For template matching, a predetermined region of the current subblock 62 neighboring may be set as a template. The decoder searches the reference picture for the region most similar to the set template. If the most similar region is found, based on the relative position between the template and the current subblock 62, the reference subblock 72 may be determined from the most similar region. According to an embodiment of the present invention, such template matching may be performed within a predetermined range 80 from the first reference subblock of the current subblock 62 obtained by affine motion prediction.

In the embodiment of FIG. 14, it is shown that the template exists on the left and upper sides of the current (sub)block, but the position of the template is not limited thereto. However, since the template of the current (sub) block in the decoder should be the part where the reconstruction is completed, the template may be determined in consideration of the decoding direction of the current picture.

FIGS. 15 to 19 show detailed embodiments of an affine motion compensation method combined with local search. In the embodiment of each drawing, parts identical or corresponding to those of the embodiment of the previous drawing are not described.

Figure 15:
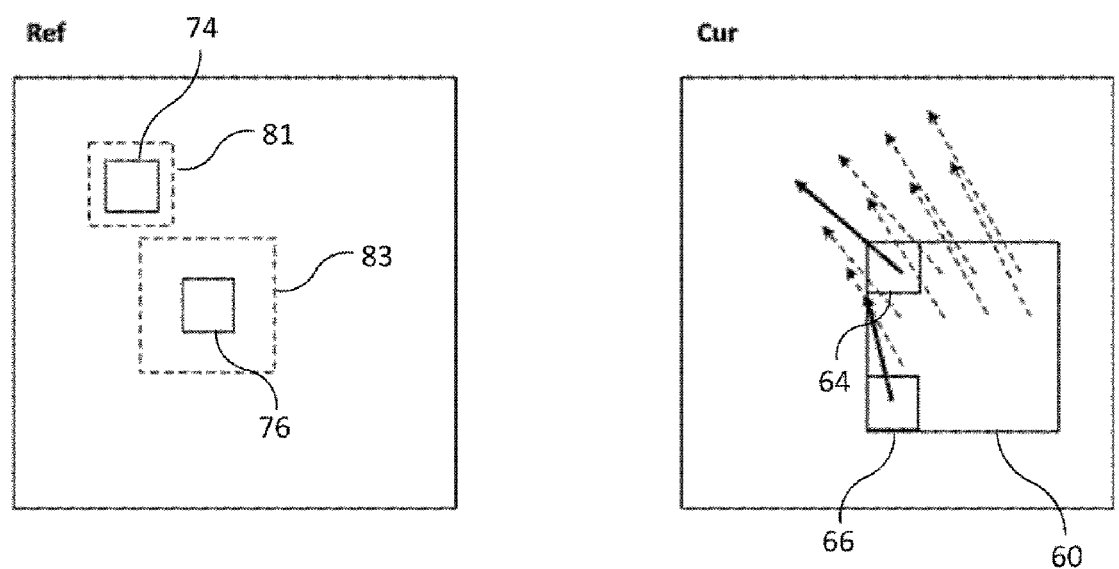
FIGS. 15 to 19 show detailed embodiments of an affine motion compensation method combined with local search.

FIG. 15 shows a first embodiment of an affine motion compensation method combined with local search. According to the first embodiment of the present invention, predetermined ranges 81 and 83 for local search may be set differently for each of subblocks 64 and 66. More specifically, the local search may be performed in a narrow range or a local search may be skipped for a subblock in which the accuracy of the motion vector is estimated to be high. Also, the local search may be performed in a wide range for a subblock in which the accuracy of the motion vector is estimated to be low. The predetermined ranges 81 and 83 in which local search for each of the subblocks 64 and 66 is performed may depend on the position of each of the subblocks 64 and 66 in the current block.

Referring to FIG. 15, the predetermined range 81 for finding the reference subblock 74 for the first subblock 64 of the current block may be different from the predetermined range 83 for finding the reference subblock 76 for the second subblock 66 of the current block. If affine motion prediction is performed based on v0 which is CPMV corresponding to the upper left corner of the current block and v1 which is CPMV corresponding to the upper right corner of the current block, the motion vector accuracy of the subblock at the bottom of the current block away from the corresponding positions may be deteriorated. Therefore, a wider range of local searches may be performed for the subblock. According to another embodiment, when the CPMV set for the current block is derived from the CPMV set of the neighboring block on which affine motion compensation is performed, a wider range of local search may be performed on the subblock at a position away from the neighboring block.

Figure 16:
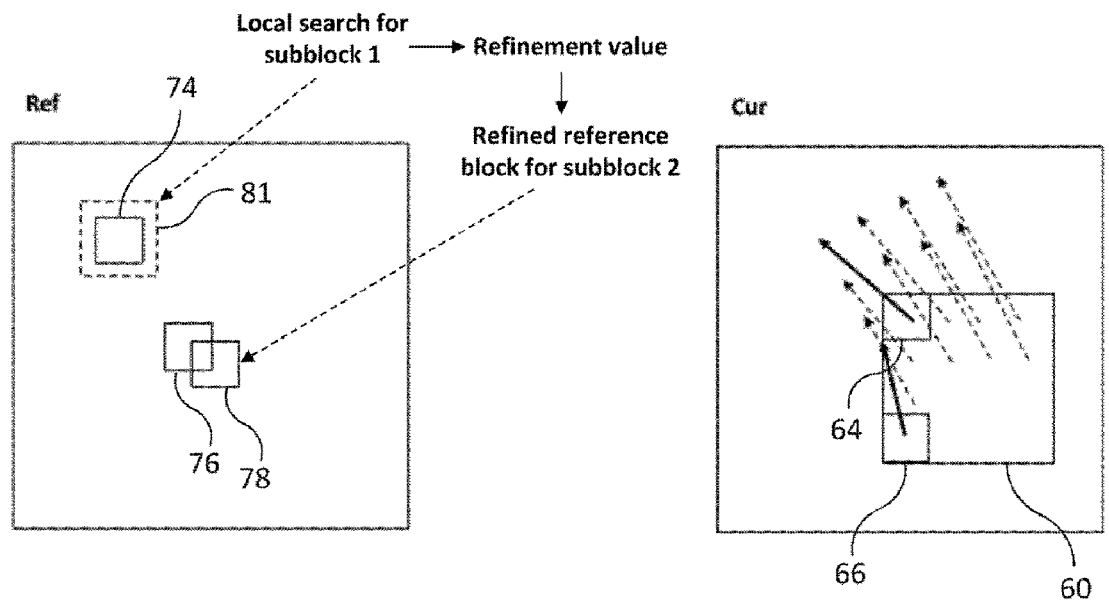

FIG. 16 shows a second embodiment of an affine motion compensation method combined with local search. According to the second embodiment of the present invention, after affine motion prediction is performed, a local search may be performed on a specific subblock of the current block, and the offset (or refinement value) obtained through local search may be used to refine motion vectors of other subblocks. Referring to FIG. 16, after affine motion prediction is performed, a local search may be additionally performed within a predetermined range 81 to find a reference subblock 74 for the first subblock 64 of the current block. When a final search subblock of the first subblock 64 is changed from an initial reference subblock by performing a local search, the offset between the position of the final reference subblock and the position of the initial reference subblock may be obtained as a refinement value. The decoder may correct motion vectors of other subblocks using the obtained refinement values. That is, the reference subblock of the second subblock 66 of the current block may be changed from the initial reference subblock 76 obtained through affine motion prediction to the final reference subblock 78 based on the refinement value. Through this method, it is possible to reduce the amount of computation according to the application of local search.

Figure 17:
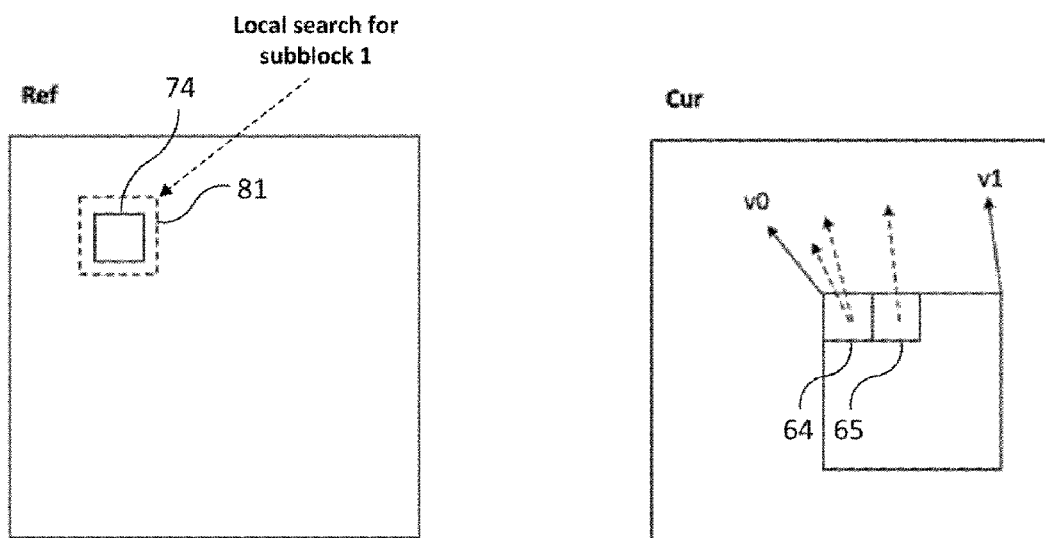

FIG. 17 shows a third embodiment of an affine motion compensation method combined with local search. According to the third embodiment of the present invention, after affine motion prediction is performed, a local search may be performed on a specific subblock of the current block, and motion vectors of other subblocks may be obtained based on the final motion vector of a specific subblock obtained through local search. Referring to FIG. 17, after affine motion prediction is performed, a local search may be additionally performed within the predetermined range 81 to find the reference subblock 74 for the first subblock 64 of the current block. By performing a local search, the final motion vector of the first subblock 64 may be changed from the initial motion vector. The decoder may obtain a motion vector of the second subblock 65 using the final motion vector of the obtained first subblock 64. According to an embodiment, the motion vector of the second subblock 65 may be obtained based on the final motion vector of the first subblock 64 and the CPMV of the current block. As described above, by using a motion vector corrected for a specific subblock to obtain a motion vector of another subblock, a more accurate motion vector may be obtained for each subblock.

Figure 18:
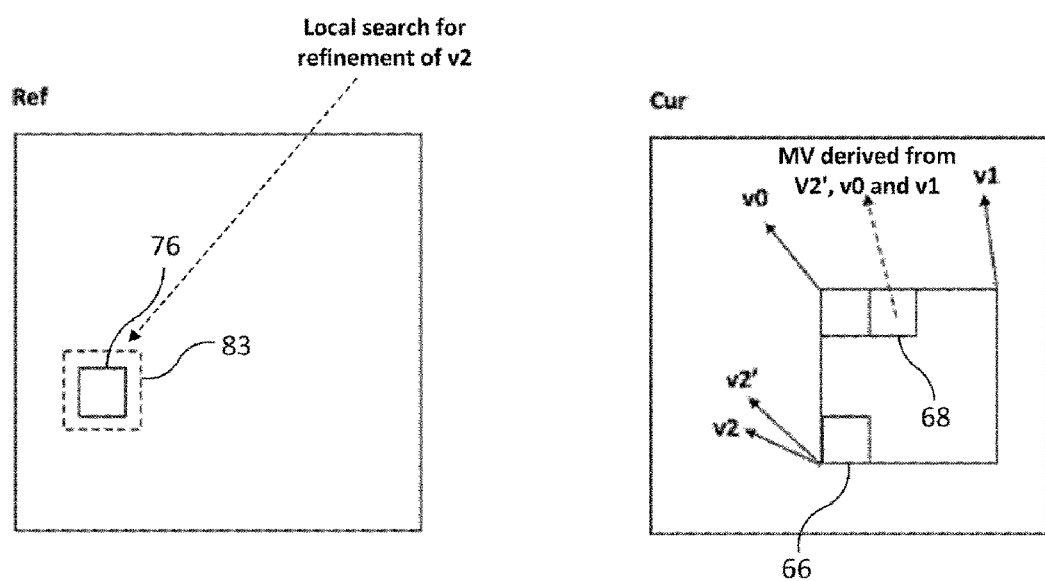

FIG. 18 shows a fourth embodiment of an affine motion compensation method combined with local search. As described above, affine motion prediction using three or more CPMVs may be performed. However, if the number of CPMVs for affine motion prediction increases, the signaling burden may increase. Accordingly, according to an embodiment of the present invention, at least some CPMVs of the CPMV set may be derived from motions of neighboring blocks, and the remaining CPMV may be calculated from other CPMVs of the current block. In this case, in order to increase the accuracy of the CPMV calculated from other CPMVs of the current block, an additional local search may be performed to obtain the purified CPMV.

Referring to FIG. 18, among CPMVs v0, v1, and v2 included in the CPMV set of the current block, v2 may be calculated based on v0 and v1. If v2 is used as it is to obtain the motion vector of the subblock, inaccuracy in the case of obtaining the motion vector of the subblock using only v0 and v1 may remain, so an additional local search may be performed. According to an embodiment, a local search for the subblock 66 closest to the location corresponding to v2 may be performed. That is, by performing a local search additionally within a predetermined range 83 from the reference subblock 76, v2', which is a purified CPMV, may be obtained. The decoder may use the purified CPMV v2' to obtain the motion vector of the subblock 68 of the current block. That is, the motion vector of the subblock 68 is calculated based on v2', v0 and v1.

According to a further embodiment of the present invention, purification for multiple CPMVs may be performed for more accurate motion vector calculation. For example, a local search for a subblock adjacent to a location corresponding to each of a plurality of CPMVs may be performed. On the other hand, according to the calculation and refinement order of CPMV, a subblock in which an existing template, for example, the template of the shape described in the embodiment of FIG. 14, does not exist, may occur. In the embodiment of FIG. 18, when attempting to perform refinement for v2 as template matching for the subblock 66, decoding of upper neighboring samples of the subblock 66 may not be completed. Therefore, in this case, a template having a shape different from the existing one may be used. As a template for subblocks, a region that is already reconstructed may be used. For example, as the template of the subblock 66, left neighboring samples that have already been reconstructed may be used. According to another embodiment of the present invention, only the area necessary to generate the template may be first decoded using v0 and v1. For example, in the embodiment of FIG. 18, by first decoding the left subblocks of the current block using v0 and v1, a template for the subblock 66 may be obtained for the purification of v2.

Figure 19:
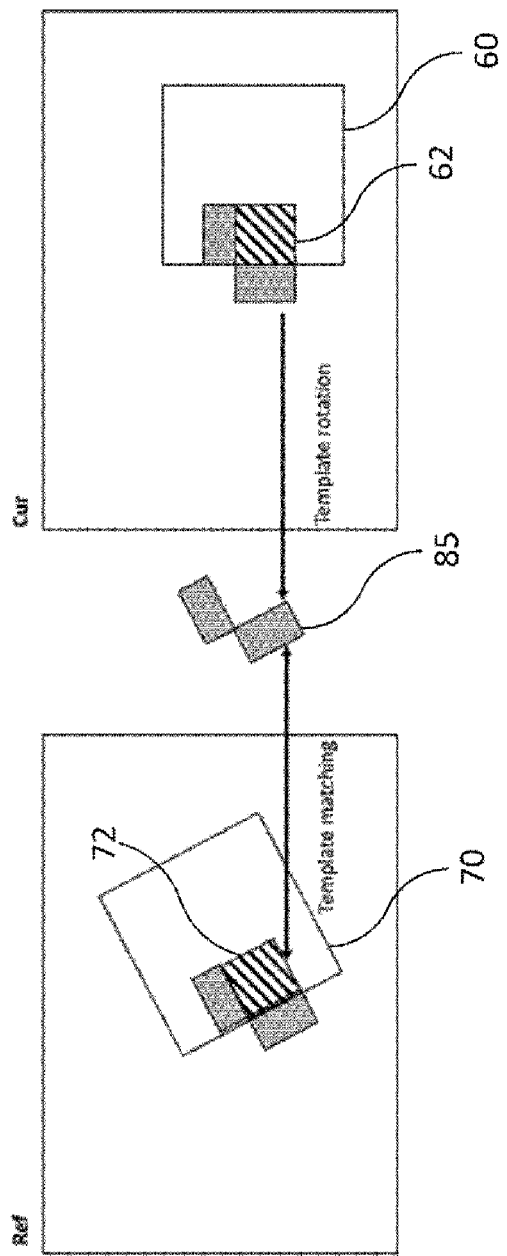

FIG. 19 shows a fifth embodiment of an affine motion compensation method combined with local search. A template for performing a local search may be generated using neighboring samples of the current subblock 62. In this case, neighboring samples of the current subblock 62 may have a similar motion to the current subblock 62. Referring to FIG. 19, the current block 60 of the current picture may be predicted through the reference block 70 of the reference picture, and the reference subblock 72 of the current subblock 62 may be refined by local search in the reference picture. In this case, as the current block 60 is affine transformed into the reference block 70, affine transformation may also be required in the template region of the current subblock 62. Therefore, according to an embodiment of the present invention, in order to perform a local search of the current subblock 62, a template 85 in which affine transformation is performed may be used. The affine transformation of the template may be performed based on at least some of the CPMVs of the current block. In addition, in the process of affine transformation of the template, subsampling, interpolation, or extrapolation of the template may be performed.

Figure 20:
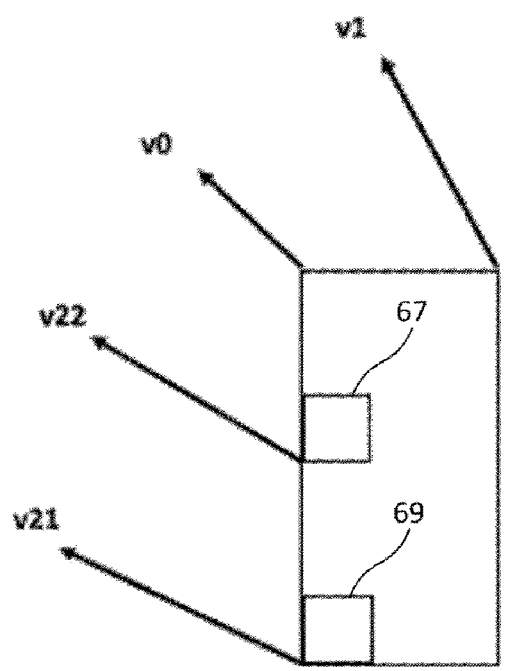
FIG. 20 shows an affine motion compensation method according to a further embodiment of the present invention.

FIG. 20 shows an affine motion compensation method according to a further embodiment of the present invention. According to a further embodiment of the present invention, the CPMV used to obtain a motion vector for each subblock of the current block may be different. In the embodiment of FIG. 20, v0 (i.e., the first CPMV) and v1 (i.e., the second CPMV) are the same as the previous embodiments, and v21 is the third CPMV corresponding to the lower left corner of the current block. In addition, v22 is a fourth CPMV corresponding to a position between a position corresponding to v0 and a position corresponding to v21. According to an embodiment of the present invention, the motion vector of the first subblock 67 in the current block may be calculated based on v0, v1 and v22, and the motion vector of the second subblock 69 may be calculated based on v0, v1 and v21. Particularly, when the current block is a block other than a square, motion vector prediction of subblocks using different CPMV sets may be performed. Meanwhile, in the embodiment of FIG. 20, v21 may be obtained from motion vector information of a block adjacent to a corresponding position (i.e., a lower left corner of the current block), and v22 may be obtained from motion vector information of a block adjacent to a corresponding position (i.e., a point between an upper left corner and a lower left corner of the current block).

Figure 21:
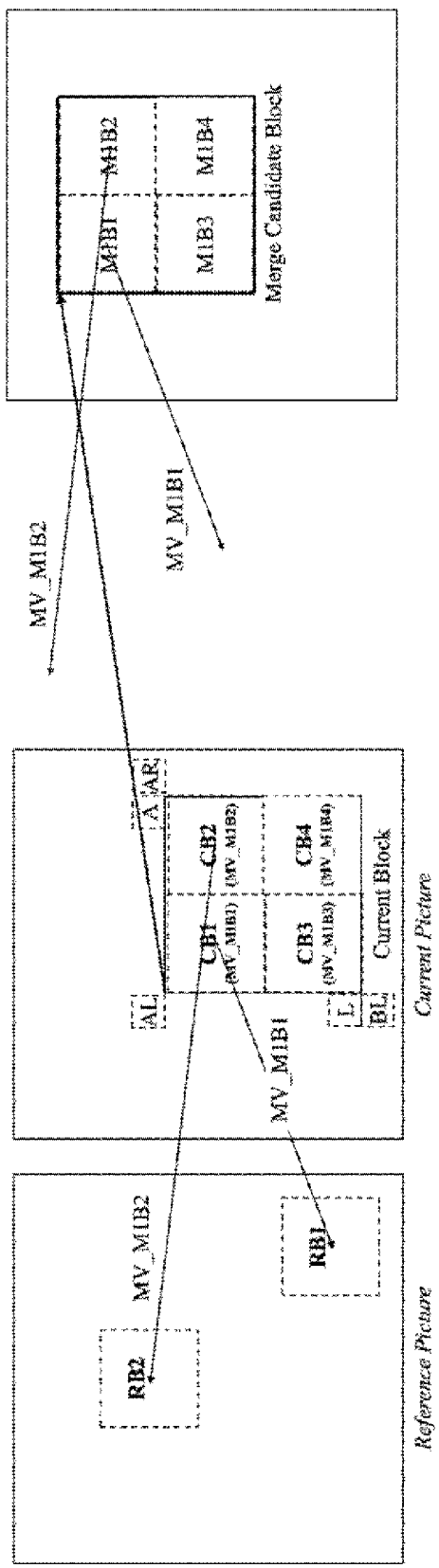
FIG. 21 shows subblock-based temporal motion vector prediction according to an embodiment of the present invention.

FIG. 21 shows subblock-based temporal motion vector prediction according to an embodiment of the present invention. In an embodiment of the present invention, subblock-based temporal motion vector prediction (SbTMVP) may also be referred to as advanced temporal motion vector prediction (ATMVP).

When temporal motion vector prediction (TMVP) is performed, the decoder predicts the motion vector of the current block using the temporal motion vector of the collocated block of the current block. However, when SbTMVP is performed, the decoder obtains a merge candidate block by applying a motion shift before fetching the temporal motion vector of the collocated block. Here, the motion shift information may be obtained from a motion vector of one of the spatial neighboring blocks of the current block. The decoder sequentially searches neighboring blocks of the current block to determine a neighboring block from which motion shift information is obtained. According to an embodiment of the present invention, the neighboring blocks to be searched to obtain motion shift information may include at least one of a left neighboring block and an upper neighboring block of the current block. For example, the neighboring block may include at least one of a left block L, an upper block A, a lower left block BL, an upper right block AR, or an upper left block AL adjacent to the current block and search may be performed in the order listed above. However, the present invention is not limited thereto. For example, a neighboring block to be searched to obtain motion shift information may include a left block L and a lower left block BL of the current block. The decoder obtains a merge candidate block of the current block based on the motion shift information obtained from the neighboring block.

The merge candidate block may be divided into subblocks of N×N. The decoder extracts motion vectors of each subblock of the merge candidate block. In this case, since different motion vectors may be used according to each sample position in the corresponding merge candidate block, motion vectors corresponding to the center position of each subblock may be extracted. In the embodiment of FIG. 21, the subblocks of any first merge candidate block are represented by M1B1, M1B2, M1B3, and M1B4, respectively, and the motion vectors corresponding to the center position of each subblock are represented by MV_M1B1, MV_M1B2, MV_M1B3, and MV_M1B4, respectively. If inter prediction is performed on all subblocks of the merge candidate block, and if each subblock does not all have the same motion vector, the merge candidate block is finally determined as the merge block. If intra prediction is performed on one or more of the subblocks of the corresponding merge candidate block, or if each subblock has the same motion vector, the merge candidate block cannot be used as a merge block. The decoder searches for neighboring blocks in the following order to find merge candidate blocks that may be used for SbTMVP. SbTMVP may be performed based on the merged block determined as described above. Since the above process may be performed in the same manner in the encoder and the decoder, information on a neighboring block for obtaining a merged block may not be signaled separately.

When a merge block to be used for SbTMVP is determined, the decoder extracts motion vectors of each subblock of the merge block to predict a motion vector of each subblock corresponding to the current block. The predictor of each subblock is obtained using the motion vector of each subblock of the current block, and the predictor of the current block is obtained by combining the predictors of each subblock. In the embodiment of FIG. 21, N×N subblocks in the current block are represented by CB1, CB2, CB3, and CB4, respectively. Each of subblocks (i.e., CB1, CB2, CB3 and CB4) obtains a predictor of the corresponding subblock using the motion vectors of the corresponding merge subblocks (i.e., M1B1, M1B2, M1B3, and M1B4).

FIGS. 22 to 27 show detailed embodiments of subblock-based temporal motion vector prediction. In the embodiment of each drawing, parts identical or corresponding to those of the embodiment of the previous drawing are not described.

Figure 22:
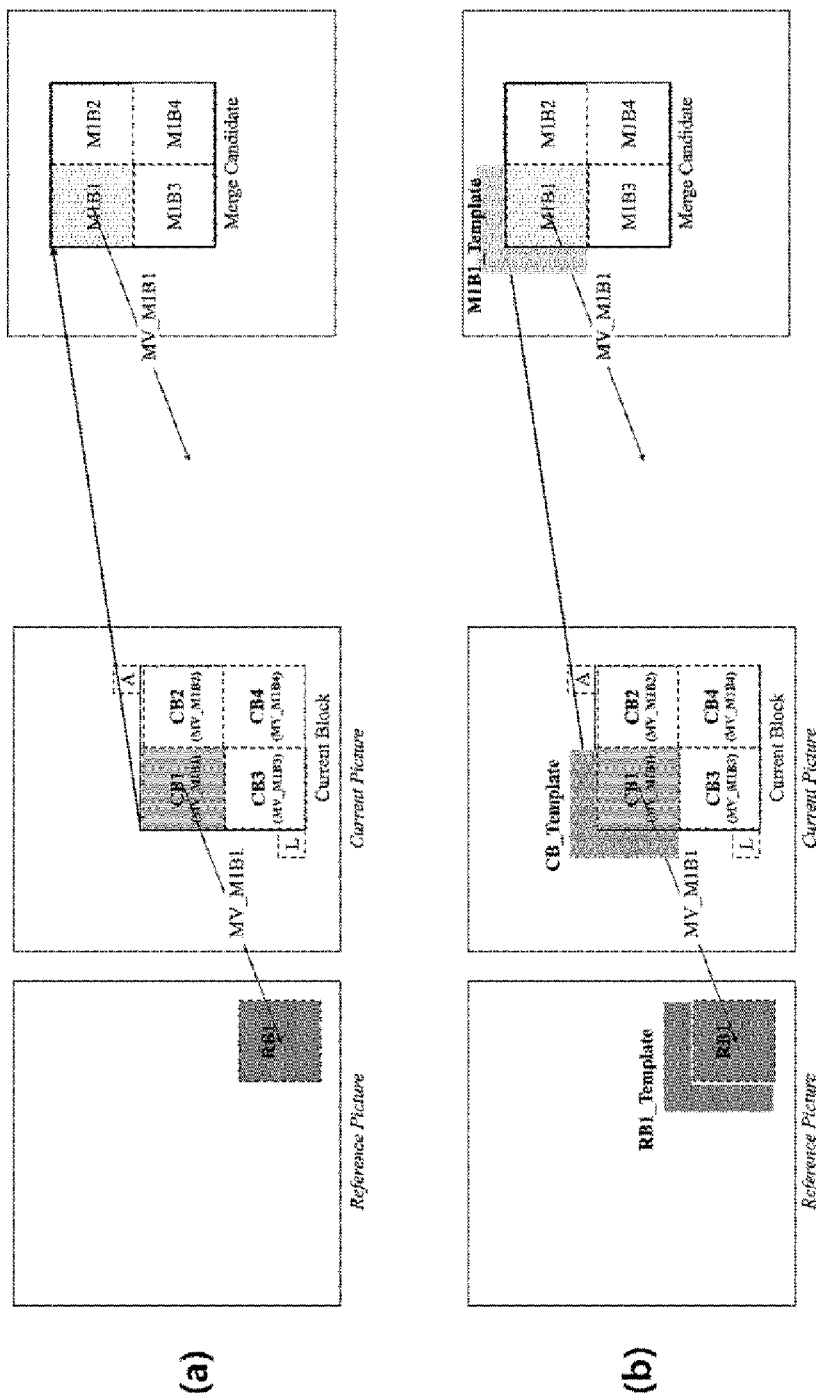
FIGS. 22 to 27 show detailed embodiments of subblock-based temporal motion vector prediction.

FIG. 22 shows a first embodiment of inter prediction using SbTMVP. FIG. 22(a) shows an embodiment of configuring a current subblock by using a signal value of a merge candidate subblock and a signal value of a reference subblock based on a motion vector of the merge candidate subblock. In addition, FIG. 22(b) shows an embodiment of constructing a current subblock by alternatively using the signal value of a merge candidate subblock and a signal value of a reference subblock based on a motion vector of the merge candidate subblock.

Referring first to FIG. 22(a), the prediction block of the current subblock CB1 may be generated considering all of the signal value of the corresponding subblock M1B1 in the merge candidate block of the current block and the signal values of the reference block RB1 referenced based on the motion vector of the corresponding subblock M1B1. In this case, a prediction block of the current subblock CB1 may be generated by applying an equal weight between the signal value of the subblock M1B1 and the signal value of the reference block RB1. According to another embodiment, a prediction block of the current subblock CB1 may be generated by applying an uneven weight based on the POC distance between each reference block and the current block.

Next, referring first to FIG. 22(b), the prediction block of the current subblock CB1 may be generated based on any one of the signal value of the corresponding subblock M1B1 in the merge candidate block of the current block and the signal values of the reference block RB1 referenced based on the motion vector of the corresponding subblock M1B1. In this case, template matching may be performed to determine which of the signal value of the subblock M1B1 and the signal value of the reference block RB1 is selected. In other words, the decoder may mutually compare the template CB_Template composed of samples around the current subblock CB1 with the template M1B1_Template composed of samples around the subblock M1B1 and the template RB1_Template composed of samples around the reference block RB1 and refer to a block having a small difference in values between templates to generate a prediction block of the current block.

Figure 23:
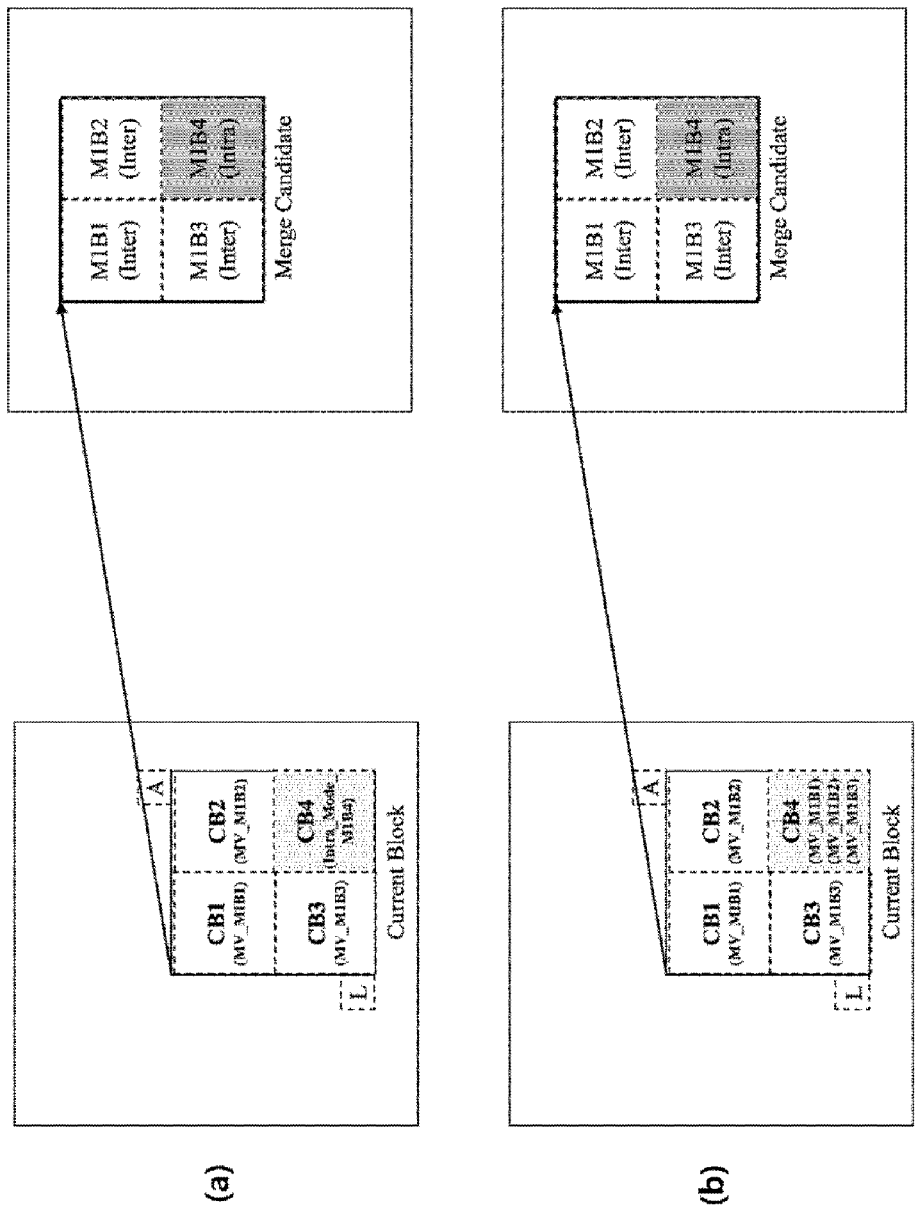

FIG. 23 shows a second embodiment of inter prediction using SbTMVP. According to the second embodiment of the present invention, when performing SbTMVP, a prediction subblock may be generated by dynamically using inter prediction and intra prediction for each subblock. Conventionally, when intra prediction is performed on at least some of subblocks in a merge candidate block, the merge candidate block cannot be used for SbTMVP. However, according to an embodiment of the present invention, even when intra prediction is performed on an arbitrary number of subblocks within a merge candidate block, the merge candidate block may be used for SbTMVP.

First, referring to the embodiment of FIG. 23(a), intra prediction was performed on the last subblock M1B4 among merge candidate subblocks M1B1, M1B2, M1B3, and M1B4 respectively corresponding to subblocks CB1, CB2, CB3, and CB4 of the current block. In this case, the prediction blocks of the subblocks CB1, CB2, and CB3 are obtained using motion vectors of merge candidate subblocks M1B1, M1B2, and M1B3, where inter prediction is performed, respectively. Meanwhile, the prediction block of the subblock CB4 may be obtained by referring to the intra prediction mode value used for intra prediction of the merge candidate subblock M1B4. On the other hand, referring to the embodiment of FIG. 23(b), the prediction block of the subblock CB4 may be obtained using all or part of motion vectors MV_M1B1, MV_M1B2, and MV_M1B3 used in neighboring subblocks M1B1, M1B2, and M1B3 of the corresponding merge candidate subblock M1B4.

Figure 24:
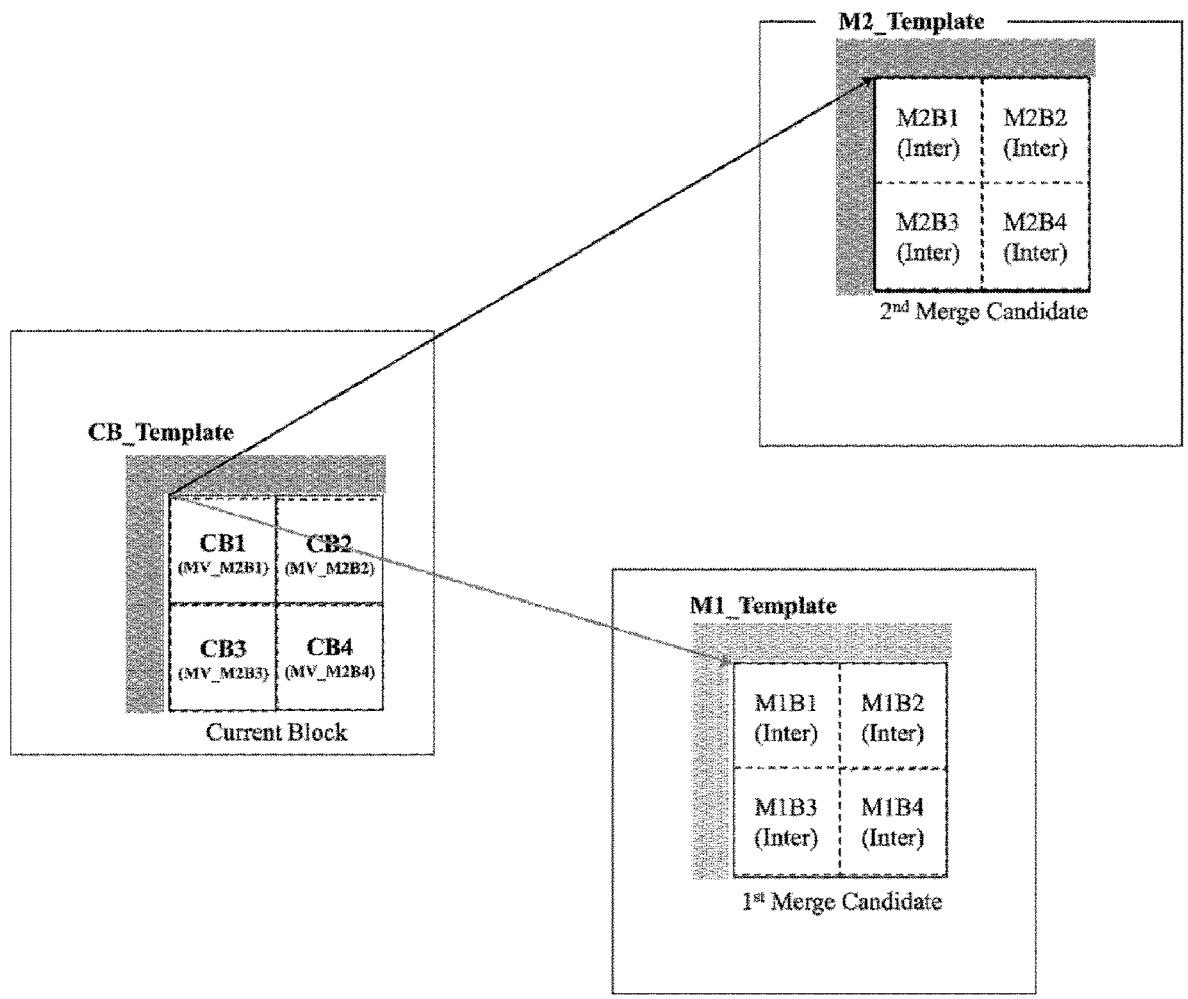

FIG. 24 shows a third embodiment of inter prediction using SbTMVP. According to the third embodiment of the present invention, in order to perform SbTMVP on the current block, the most suitable merge block among a plurality of merge candidate blocks may be selected. Referring to FIG. 24, subblocks of any first merge candidate block are represented by M1B1, M1B2, M1B3, and M1B4, respectively, and subblocks of any second merge candidate block are represented by M2B1, M2B2, M2B3, and M2B4, respectively. In the conventional case, if inter prediction is performed on all subblocks of the first merge candidate block, and each subblock does not have the same motion vector, SbTMVP may be performed based on the merge candidate block. However, if a plurality of merge candidate blocks satisfy the above conditions, the decoder may perform SbTMVP by selecting the most suitable merge candidate block among the multiple merge candidate blocks.

More specifically, template matching may be performed to determine the most suitable merge candidate block. In other words, the decoder may compare the template CB_Template composed of samples around the current block neighboring with the template M1_Template composed of samples around the first merge candidate block and the template M2_Template composed of samples around the second merge candidate block, and perform SbTMVP by determining a candidate block with a small difference in values between templates as a merge block of the current block. In this case, the difference in values between templates may be calculated through Sum of Absolute Difference (SAD) or Sum of Absolute Transform Difference (SATD).

Figure 25:
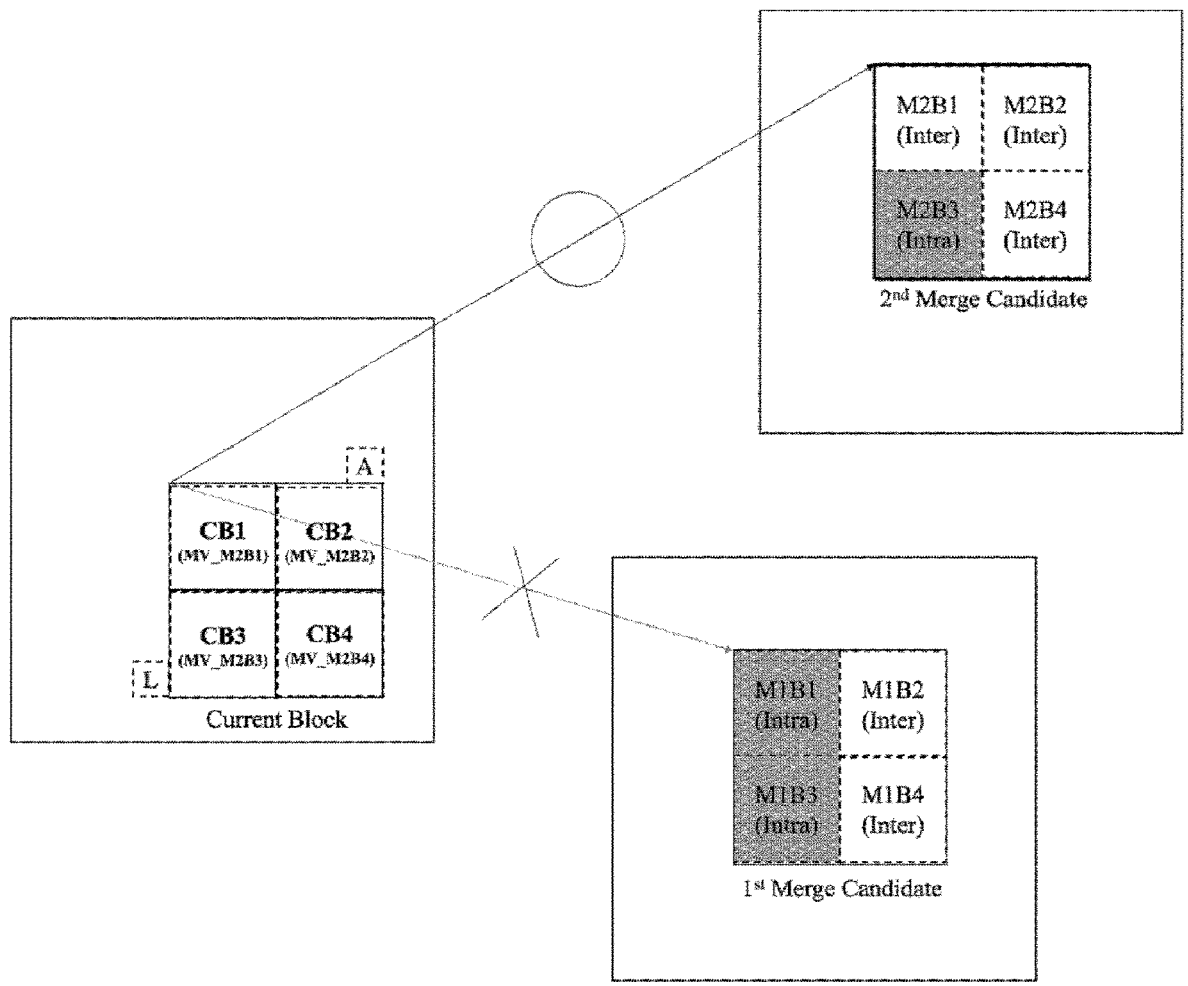

FIG. 25 shows a fourth embodiment of inter prediction using SbTMVP. The fourth embodiment of the present invention proposes another method of selecting the most suitable merge block among a plurality of merge candidate blocks to perform SbTMVP on the current block. In the embodiment of FIG. 25, intra prediction is performed on the subblocks M1B1 and M1B3 of the first merge candidate block and the subblock M2B3 of the second merge candidate block. In this case, when a merge candidate block satisfies a specific condition, it may be used for SbTMVP of the current block.

First, based on the ratio between the number of subblocks in which intra prediction is performed and the number of subblocks in which inter prediction is performed in each merge candidate block, it may be determined whether the corresponding merge candidate block may be used for the SbTMVP of the current block. In the embodiment of FIG. 25, intra prediction is performed on two subblocks among a total of four subblocks in the first merge candidate block, and intra prediction is performed on one subblock among a total of four subblocks in the second merge candidate block. Accordingly, a second merge candidate block satisfying a predetermined ratio may be determined as a merge block used for SbTMVP.

Second, based on whether a position of a subblock in which intra prediction is performed within each merge candidate block satisfies a specific condition, it may be determined whether the corresponding merge candidate block may be used for the SbTMVP of the current block. For example, when the intra-prediction subblock is present in a specific location (e.g., a middle region or a bottom right region within a merge candidate block), this merge candidate block may be used for SbTMVP. In addition, when the subblock on which intra prediction is performed is surrounded by the subblocks on which inter prediction is performed, the corresponding merge candidate block may be used for SbTMVP.

Figure 26:
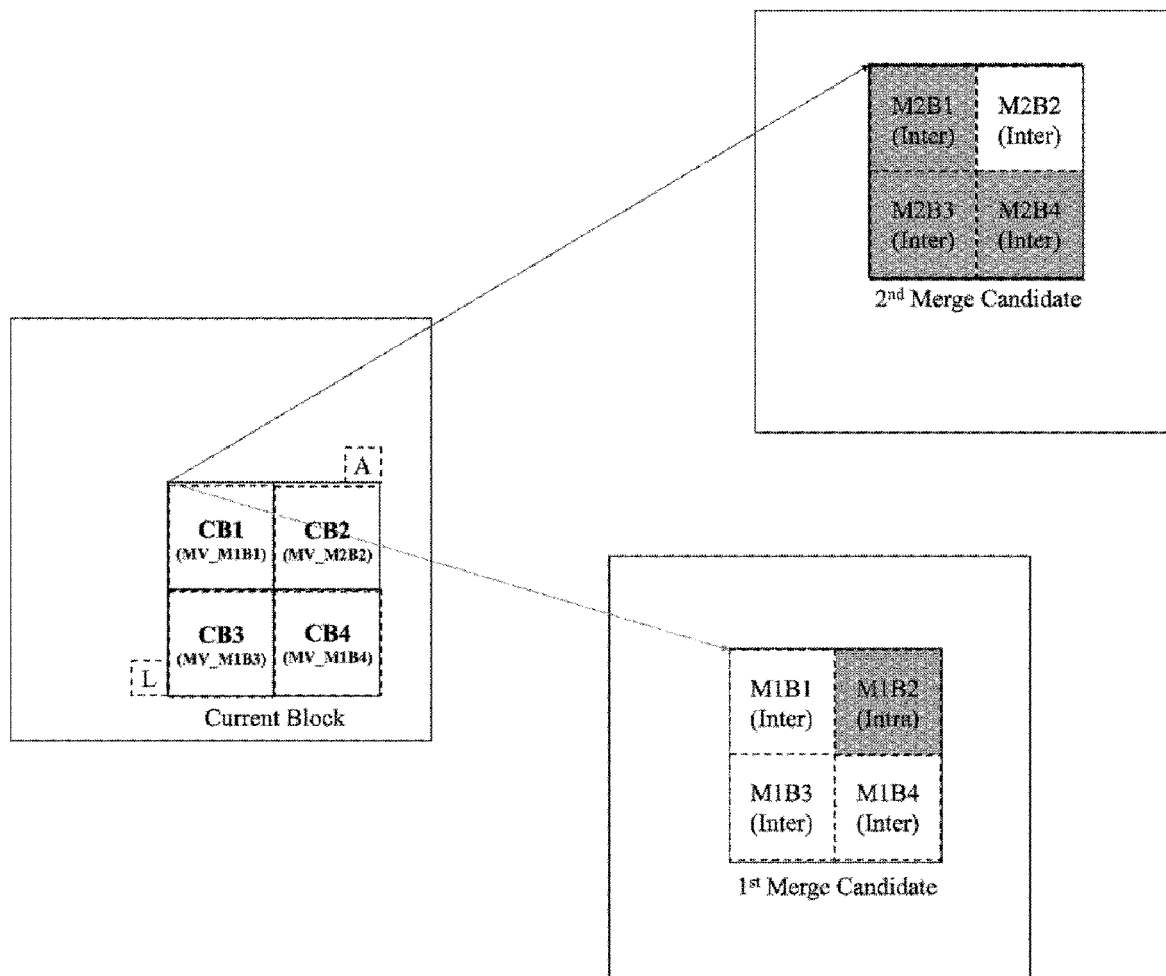

FIG. 26 shows a fifth embodiment of inter prediction using SbTMVP. As described above, if inter prediction is performed on all subblocks of the merge candidate block, and each subblock does not have the same motion vector, SbTMVP may be performed based on the merge candidate block. However, according to the fifth embodiment of the present invention, even if the above conditions are not satisfied, a merge candidate block may be used for SbTMVP.

More specifically, the decoder finds the first merge candidate block in the order described above. In the embodiment of FIG. 26, inter prediction is performed on the subblocks M1B1, M1B3, and M1B4 of the first merge candidate block, and intra prediction is performed on the subblocks B1 and B2. Thus, the decoder obtains the prediction blocks of each of the subblocks CB1, CB3 and CB4 of the current block using motion vectors of subblocks M1B1, M1B3, and M1B4 on which inter prediction is performed are used among the subblocks of the first merge candidate block. Since the prediction block of the subblock CB2 of the current block is not obtained, the decoder searches for the second merge candidate block according to the above-described order. When inter prediction is performed on the merge candidate subblock M2B2 corresponding to the subblock CB2 in the second merge candidate block, the prediction block of the subblock CB2 of the current block may be obtained using the motion vector of the subblock M2B2. As described above, according to the fifth embodiment of the present invention, a prediction block of a current block may be configured by sequentially referring to subblocks on which inter prediction is performed in one or more merge candidate blocks.

Figure 27:
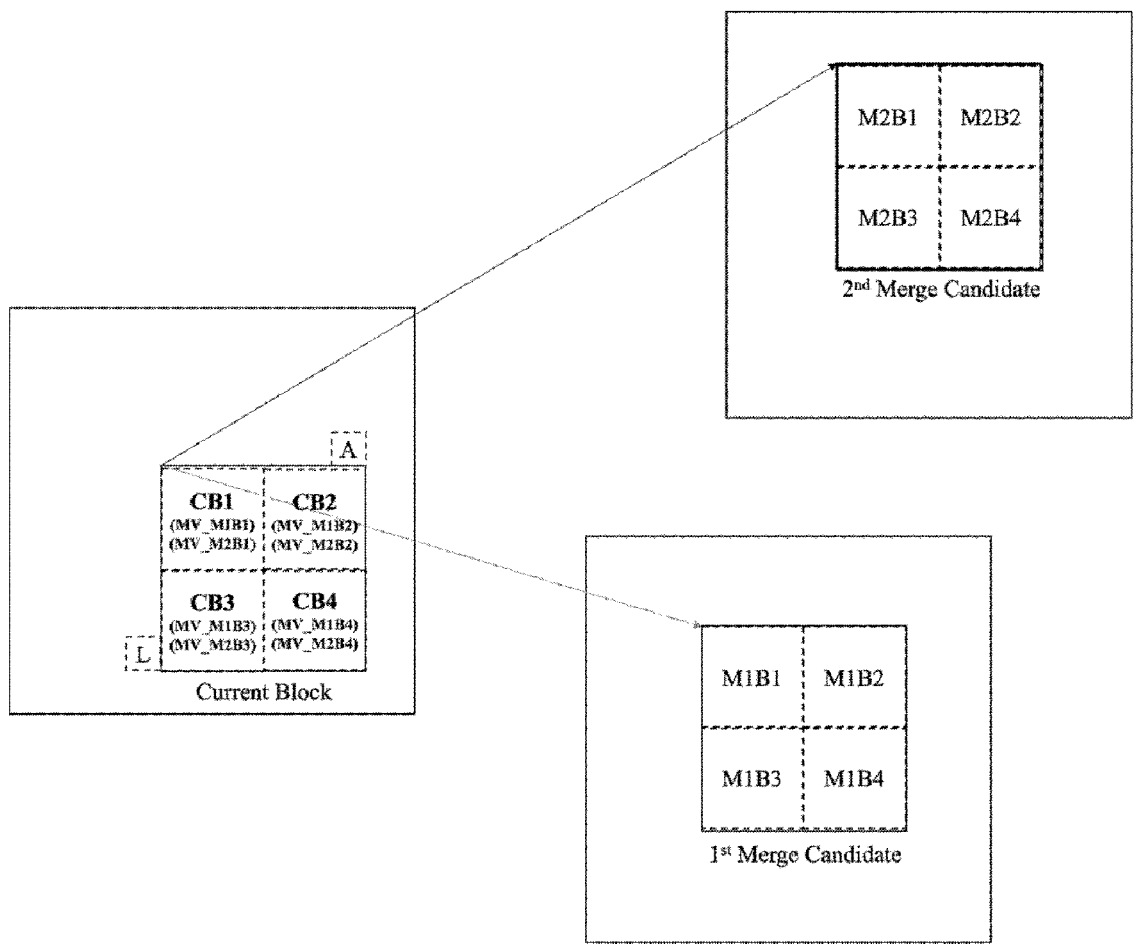

FIG. 27 shows a sixth embodiment of inter prediction using SbTMVP. According to a sixth embodiment of the present invention, in order to perform SbTMVP on the current block, motion vectors of multiple merge candidate blocks may be used together. More specifically, in the embodiment of FIG. 27, when both the first merge candidate block and the second merge candidate block satisfy the condition to be used for SbTMVP, the prediction block of each subblock of the current block may be obtained by using motion vectors of corresponding multiple merge candidate subblocks together. For example, the motion vector of the current subblock CB1 may be obtained by combining the motion vectors MV_M1B1 and MV_M2B1 of the corresponding merge candidate subblocks M1B1 and M2B1. In this case, a motion vector of the current subblock CB1 may be generated by applying an equal weight between the motion vector MV_M1B1 and the motion vector MV_M2B. According to another embodiment, a motion vector of the current subblock CB1 may be generated by applying an uneven weight based on the POC distance between each reference block and the current block.

Figure 28:
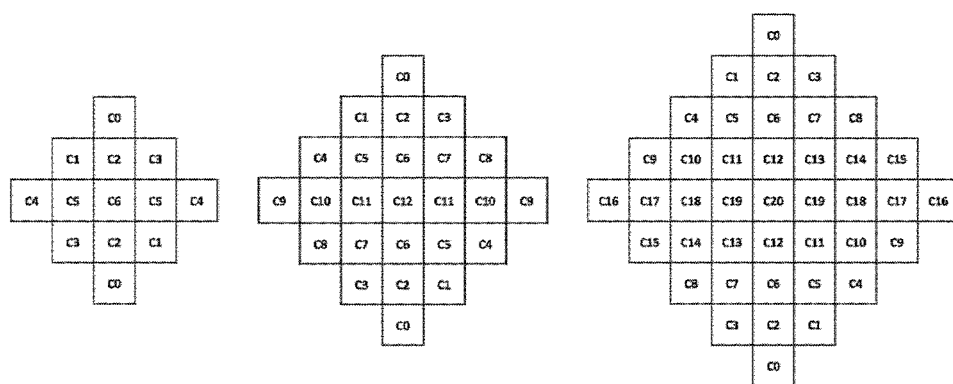
FIG. 28 shows an adaptive loop filter according to an embodiment of the present invention.

FIG. 28 shows an adaptive loop filter according to an embodiment of the present invention. As described above, the filtering unit of the encoder and decoder performs a filtering operation to improve the quality of the reconstructed picture. Pictures filtered through the filtering unit are stored in a decoded picture buffer. In this case, the filter in the loop of the encoder or decoder is called an in-loop filter. In addition, an adaptive loop filter (ALF) that applies different in-loop filters according to the characteristics of the filtering target samples may be used. For example, an in-loop filter may be applied according to one or more gradients, directionality or activities. In addition, a filter shape, a filter length, a filter coefficient, and a range to which the same filter is applied may be changed according to the characteristics of the filtering target samples.

According to an embodiment of the present invention, the adaptive loop filter may include filters of various shapes, and the decoder may adaptively apply them. For example, the shape of the filter may include square, diamond, rectangle, circle, and the like. In addition, the adaptive loop filter may include filters of multiple sizes. Here, the size of the filter indicates a range of neighboring samples considered when filtering a specific sample. Also, for the same filter shape and size, there may be multiple filter coefficient sets constituting an adaptive loop filter. The decoder may adaptively apply any one of the multiple filters configured as described above.

Referring to FIG. 28, the adaptive loop filter may have three diamond shapes. Each small square in FIG. 28 corresponds to one or more samples, and the values specified in the square represent filter coefficients. As shown in the drawing, the adaptive loop filter may include 5×5 diamond shapes (i.e., FIG. 28(a)), 7×7 diamond shapes (i.e., FIG. 28(b)), and 9×9 diamond shapes (i.e., FIG. 28(c)). The filter coefficient set constituting each filter may be composed of different filter coefficients. Alternatively, at least some filter coefficients of a filter coefficient set constituting each filter may have duplicate values.

According to an embodiment of the present invention, adaptive loop filters of different shapes may be applied to the luma component and the chroma component. For example, all three types of filters illustrated in FIG. 28 may be applied to the luma component, and only one type of filter may be applied to the chroma component, for example, a 5×5 diamond-shaped filter. According to another embodiment, a set of filter coefficients applicable to each filter shape may be different for a luma component and a chroma component. According to an embodiment of the present invention, information on a filter shape to be used in a decoder may be signaled separately. In this case, the range to which the signaling is applied may be a picture, a tile (or slice), CTU, or CU. The decoder may perform filtering using a set of filter coefficients corresponding to the signaled filter shape.

The filtering process of the adaptive loop filter may be performed by summing the weights between the filtering target sample and the neighboring samples. More specifically, the filtering process of the adaptive loop filter may be expressed as Equation 4 below.

$$R'(i, j) = \sum_{k=-L/2}^{L/2} \sum_{l=-L/2}^{L/2} f(k, l) \times R(i+k, j+l) \quad \text{[Equation 4]}$$

Here, R(i+k, j+l) represents a sample at the position of the coordinate (i+k, j+l) position, and R'(i, j) represents a filtered sample. In addition, L represents a filter length, and f(k, 1) represents a filter coefficient corresponding to the coordinates (k, 1). The filtering target sample R(i, j) is corrected to the filtered sample R'(i, j) by the filtering process.

Referring to FIG. 28(a), sample C6 may be filtered based on Equation 4 above. In this case, the filtered sample is obtained based on a value obtained by multiplying a sample value at a position corresponding to each square of the illustrated filter by a filter coefficient (i.e., any one of C0 to C6) of the corresponding square.

Hereinafter, a method of calculating gradient and directionality for applying an adaptive loop filter will be described. According to an embodiment of the present invention, gradient may mean a change in value, derivative, acceleration, and the like. In addition, the directionality may indicate information such as whether there is a value movement or which direction there is a movement. For example, the directionality may be determined according to the gradient. According to an embodiment of the present invention, the gradient may be calculated for a vertical direction, a horizontal direction, two diagonal directions, and the like. In addition, 1-D Laplacian may be used when calculating the gradient.

According to an embodiment of the present invention, the gradients $g_v$, $g_h$, $g_{d1}$, and $g_{d2}$ for the vertical direction, the horizontal direction, and two diagonal directions may be calculated as in Equation 5 below.

[Equation 5]

$$g_v = \sum_{k=i-2}^{i+3} \sum_{l=j-2}^{j+3} V_{k,l},$$

$$V_{k,l} = |2R(k, l) - R(k, l-1) - R(k, l+1)|,$$

$$g_h = \sum_{k=i-2}^{i+3} \sum_{l=j-2}^{j+3} H_{k,l},$$

$$H_{k,l} = |2R(k, l) - R(k-1, l) - R(k+1, l)|,$$

$$g_{d1} = \sum_{k=i-2}^{i+3} \sum_{l=j-2}^{j+3} D1_{k,l},$$

$$D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l},$$

$$D2_{k,l} = |2R(k, l) - R(k-1, l+1) - R(k+1, l-1)|$$

Here, R(i, j) is the reconstructed sample value at the position of (i, j). The coordinate values (i, j) may be representative values of a specific range. That is, when calculating gradient, directionality, and the like, representative coordinates (i, j) of a specific range may be selected. For example, the upper left coordinate of a 2×2 block may be used as the (i, j) value of the corresponding block.

Referring to Equation 5, $V_{k,l}$, $H_{k,l}$, $D1_{k,l}$, and $D2_{k,l}$ may be calculated using the sample values of (k, 1) and the values of both neighboring samples. That is, $V_{k,l}$ represents the amount of change in the sample value in the vertical direction, $H_{k,l}$ represents the amount of change in the sample value in the horizontal direction, $D1_{k,l}$ represents the amount of change in the sample value in the first diagonal direction, and $D2_{k,l}$ represents the amount of change in the sample value in the second diagonal direction. In this case, gradient $g_v$, $g_h$, $g_{d1}$, and $g_{d2}$ may be calculated by adding $V_{k,l}$, $H_{k,l}$, $D1_{k,l}$ and $D2_{k,l}$ to a predetermined range, respectively. According to Equation 5, when the samples used to calculate $V_{k,l}$, $H_{k,l}$, $D1_{k,l}$ and $D2_{k,l}$ have a small or constant value change in the sample order, the gradient becomes small. On the other hand, when the samples used to calculate $V_{k,l}$, $H_{k,l}$, $D1_{k,l}$ and $D2_{k,l}$ have a large change in value in the sample order, the gradient becomes large. Therefore, if the gradient for a specific direction is large, it may be said that an irregular change occurs in the corresponding direction or the movement is large. According to an embodiment of the invention, the predetermined range for calculating the gradient of the (i, j) position may be a range in which an offset from −2 to +3 is applied to each of the x and y coordinates of (i, j).

Meanwhile, directionality may be determined based on the gradient calculated according to the above-mentioned method. First, a larger value and a smaller value of the gradients $g_v$ and $g_h$ may be expressed by $g^{max}_{h,v}$ and $g^{min}_{h,v}$, respectively. In addition, a larger value and a smaller value of the gradients $g_{d1}$ and $g_{d2}$ may be expressed by $g^{max}_{d1,d2}$ and $g^{min}_{d1,d2}$, respectively. The directionality D may be divided into a small movement overall, a large movement in a specific direction, and a small movement in a specific direction. For example, directionality D may be divided into a small movement overall, a large movement in the horizontal or vertical direction, a small movement in the horizontal or vertical direction, a large movement in the diagonal direction, or a small movement in the diagonal direction.

According to an embodiment, the directionality D may be classified through the following steps. In this case, t1 and t2 are predetermined thresholds.

Operation 1: If $g^{max}_{h,v} \leq t1*g^{min}_{h,v}$ and $g^{max}_{d1,d2} \leq t1*g^{min}_{d1,d2}$, D is 0. This may indicate that there is a small movement in the horizontal or vertical direction, and there is a small movement in the two diagonal directions. In addition, this may indicate that there is a small movement as a whole.

Operation 2: If $g^{max}_{h,v}/g^{min}_{h,v} > g^{max}_{d1,d2}/g^{min}_{d1,d2}$, go to operation 3, otherwise go to operation 4. Going to operation 3 may indicate that horizontal or vertical movement is greater than two diagonal movements. Going to operation 4 may indicate that the movement of the two diagonals is greater than the movement in the horizontal or vertical direction.

Operation 3: If $g^{max}_{h,v} > t2*g^{min}_{h,v}$, D is 2, otherwise D is 1. If D is 2, it may represent that the horizontal movement is greater than the vertical movement, or the vertical movement is greater than the horizontal movement. In addition, if D is 1, it may represent that the horizontal movement and the vertical movement are not significantly different.

Operation 4: If $g^{max}_{d1,d2} > t2*g^{min}_{d1,d2}$, D may be 4, otherwise D may be 3. D=4 indicates that the difference between the two diagonal movements is large, and D=3 may indicate that the difference between the two diagonal movements is not large.

Hereinafter, a method of calculating an activity for applying an adaptive loop filter will be described. The activity may not represent a specific directionality, but may represent a value indicating the overall movement of a specific range. In the embodiment of the present invention, activity A may be calculated as in Equation 6 below.

$$A = \sum_{k=i-2}^{i+3} \sum_{l=j-2}^{j+3} (V_{k,l} + H_{k,l})$$ [Equation 6]

That is, activity A may be calculated as a value obtained by summing the sample value change amount $V_{k,l}$ in the vertical direction and the sample value change amount $H_{k,l}$ in the horizontal direction within a predetermined range. According to one embodiment, the activity may be quantized and used. That is, A' obtained when activity A is quantized may be used, and A' may be an integer between 0 and 4.

According to an embodiment of the present invention, a sample or a sample range may be classified according to characteristics. The adaptive loop filter may apply different filters according to the classification (i.e., class). Samples or sample ranges may be classified based on the directionality or activity described above. In this case, the sample range may be a 2×2 block, but the present invention is not limited thereto. According to an embodiment, the class index C may be determined as shown in Equation 7 below based on the directionality D and the activity A'.

$$C=5*D+A'$$ [Equation 7]

Hereinafter, a geometric transformation method of filter coefficients according to an embodiment of the present invention will be described. It is preferable that the most suitable filter is used for each sample among the multiple filters applicable in the encoder and decoder. However, since the decoder does not have the original video, it is difficult to determine the most suitable filter, and the decoder must select a filter due to the protocol between the encoder and the decoder. Therefore, the encoder may pass the filter information to the decoder, and signaling overhead may occur in the delivery of this filter information. Therefore, the encoder delivers limited filter information, and the decoder may use the received filter information by modifying it or the stored filter information. As an example of modifying and using filter information, there is a geometric transformation method as shown in Equation 8 below. The geometric transformation is an operation that changes the position of filter coefficients in a specific filter shape.

Diagonal: $f_D(k,l)=f(l,k)$

Vertical flip: $f_V(k,l)=f(k,K-l-1)$

Rotation: $f_R(k,l)=f(K-l-1,k)$ [Equation 9]

Referring to Equation 8, the geometric transformation may include diagonal flipping, vertical flipping, rotation, and the like. K is the filter size, and k and l represent the coordinates of the filter coefficients. k and l are 0 to K−1, (0, 0) is the upper left corner, and (K−1, K−1) are the lower right corner.

According to an embodiment of the present invention, filtering according to Equation 4 may be performed using filter coefficients on which geometric transformation is performed. Through geometric transformation, various filters may be implemented with less signaling. In addition, a set of filter coefficients suitable for a specific motion characteristic (i.e., gradient, directionality, and activity) may be transformed into a set of filter coefficients suitable for other motion characteristics through geometric transformation. For example, filter coefficients suitable for vertical motion may be transformed into coefficients suitable for diagonal motion through geometric transformation.

According to an embodiment of the present invention, the geometric transformation may be determined by gradient. For example, if $g_{d2}<g_{d1}$ and $g_h<g_v$, geometric transformation may not be performed. Also, if $g_{d2}<g_{d1}$ and $g_v<g_h$, diagonal flipping may be performed. Also, if $g_{d1}<g_{d2}$ and $g_h<g_v$, vertical flipping may be performed. Also, if $g_{d1}<g_{d2}$ and $g_v<g_h$, rotation may be performed. In this case, the rotation may be clockwise rotation or counterclockwise rotation.

Hereinafter, a method for signaling a filter parameter according to an embodiment of the present invention will be described. The filter parameter may be signaled as a picture level, a tile level (or slice level), a CTU level, a CU level, and the like. In order to reduce signaling overhead, the filter parameters may be signaled at a picture level or a tile level (or slice level). The filter coefficients may be signaled as the filter parameters. According to one embodiment, in order to reduce signaling overhead, different common filter coefficients may be used for different classes (i.e. merge). Also, filter coefficients stored in the decoder may be reused. For example, a filter coefficient set stored for filtering of a reference picture may be used for filtering of the current picture. For this, a reference picture index for referring to filter coefficients may be signaled.

According to another embodiment, a filter coefficient set may be managed by first-in-first-out (FIFO) for reuse of filter coefficients, temporal prediction, and the like. In addition, multiple candidate lists may be maintained to support temporal scalability. In this case, a temporal layer index may be allocated to the filter coefficient set. According to another embodiment, in order to reduce signaling overhead, fixed filters may be maintained in addition to the signaled filter coefficient set. When using a fixed filter, the encoder and decoder may transmit and receive a filter index without transmitting and receiving filter coefficients. When both the signaled filter coefficient set and a fixed filter may be used, a flag and a filter index indicating whether a fixed filter is used may be transmitted.

In addition, information on whether an in-loop filter or an adaptive loop filter is used, and which filter is used may be indicated at different levels for the luma component and the chroma component. For example, in order to apply a more detailed filtering process to the luma component, the signaling level for the luma component may be smaller than the signaling level for the chroma component. That is, the filtering process may be controlled in units of CUs for the luma component, and the filtering process may be controlled in units of pictures for the chroma component.

Figure 29:
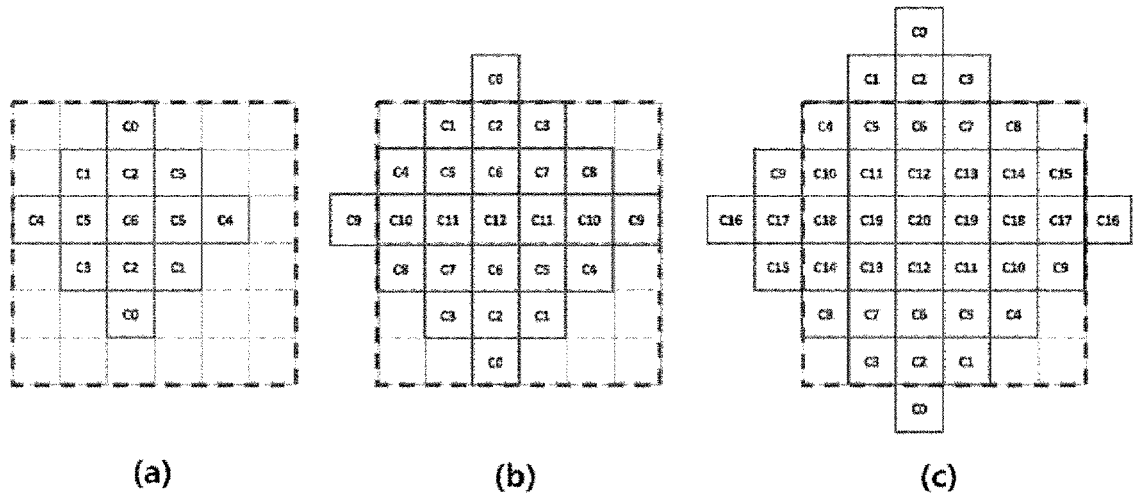
FIG. 29 shows a filtering process according to an embodiment of the present invention.

FIG. 29 shows a filtering process according to an embodiment of the present invention. According to an embodiment of the present invention, the range of calculating the above-described class, gradient, directionality and/or activity (hereinafter, sample characteristic) may not match the filter shape. For example, the shape of the filter (or filter length) may vary, but mismatch between them may occur when calculation of sample properties is performed within a predetermined range. Referring to FIG. 29, the predetermined range in which the calculation of sample characteristics is performed is an area of 6×6 (indicated by a dotted line), but the adaptive loop filter may have a 5×5 diamond shape (i.e., FIG. 29(a)), a 7×7 diamond shape (i.e., FIG. 29(b)), or a 9×9 diamond shape (i.e., FIG. 29(c)). In this case, the 5×5 diamond-shaped adaptive loop filter is covered by a predetermined range, but the 7×7 diamond-shaped and 9×9 diamond-shaped adaptive loop filters are not covered by a predetermined range. Thus, samples that are used for classes but not used for filtering and samples that are not used for classes but used for filtering may occur. If this mismatch occurs, the classification process does not express well the characteristics of the range that affects the sample filtered by the filter shape, so that the performance of the adaptive loop filter may degrade.

Figure 30:
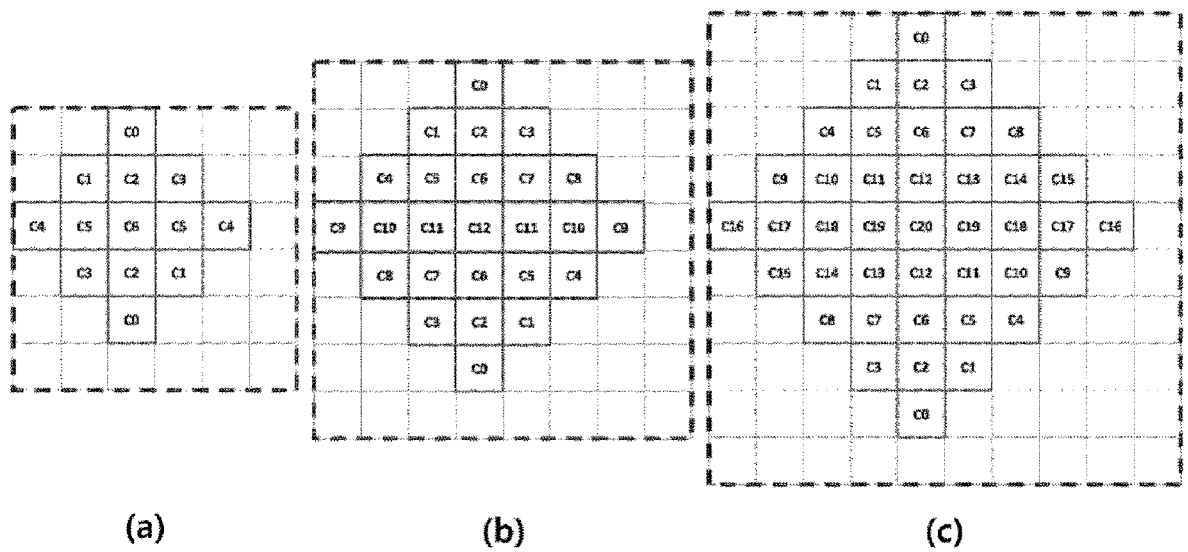
FIG. 30 shows a filtering process according to another embodiment of the present invention.

FIG. 30 shows a filtering process according to another embodiment of the present invention. In order to solve the above-described problem, a predetermined range for the calculation of sample characteristics may be determined depending on the filter shape (or filter length). That is, the predetermined range may be set to a larger value as a larger filter is used. For example, the gradients $g_v$, $g_h$, $g_{d1}$, and $g_{d2}$ for the vertical direction, the horizontal direction, and two diagonal directions may be calculated as in Equation 9 below.

[Equation 9]

$$g_v = \sum_{k=i-f1(L)}^{i+f2(L)} \sum_{l=j-f1(L)}^{j+f2(L)} V_{k,l},$$

$$V_{k,l} = |2R(k, l) - R(k, l-1) - R(k, l+1)|$$

$$g_h = \sum_{k=i-f1(L)}^{i+f2(L)} \sum_{l=j-f1(L)}^{j+f2(L)} H_{k,l},$$

$$H_{k,l} = |2R(k, l) - R(k-1, l) - R(k+1, l)|$$

$$g_{d1} = \sum_{k=i-f1(L)}^{i+f2(L)} \sum_{l=j-f1(L)}^{j+f2(L)} D1_{k,l},$$

$$D1_{k,l} = |2R(k, l) - R(k-1, l-1) - R(k+1, l+1)|$$

$$g_{d2} = \sum_{k=i-f1(L)}^{i+f2(L)} \sum_{j=j-f1(L)}^{j+f2(L)} D2_{k,l},$$

$$D2_{k,l} = |2R(k, l) - R(k-1, l+1) - R(k+1, l-1)|$$

In addition, activity A may be calculated as in Equation 10 below.

[Equation 10]

$$A = \sum_{k=i-f1(L)}^{i+f2(L)} \sum_{l=j-f1(L)}^{j+f2(L)} (V_{k,l} + H_{k,l})$$

Here, L is the filter length.

In the embodiments of Equations 5 and 6 described above, the predetermined range for calculating the sample value change amounts $V_{k,l}$, $H_{k,l}$, $D1_{k,l}$, and $D2_{k,l}$ is fixed to the range of applying an offset from −2 to +3 for each of the x and y coordinates of (i, j). However, according to the embodiments of Equations 9 and 10, the predetermined range may be variably determined by the functions f1(L) and f2(L) based on the filter length L. That is, the predetermined range is determined as a range in which an offset from −f1(L) to +f2(L) is applied to each of the x and y coordinates of (i, j). According to an embodiment, f1(L) may be floor (L/2), and f2(L) may be (floor(L/2)+1) (where L is 5, 7 or 9).

Referring to FIG. 30, a predetermined range in which the calculation of sample characteristics is performed may vary depending on the shape of the filter. In all cases of 5×5 diamond shape (i.e., FIG. 30(a)), 7×7 diamond shape (i.e., FIG. 30(b)), and 9×9 diamond shape (i.e., FIG. 30(c)), the adaptive loop filter may be covered by a predetermined range.

Figure 31:
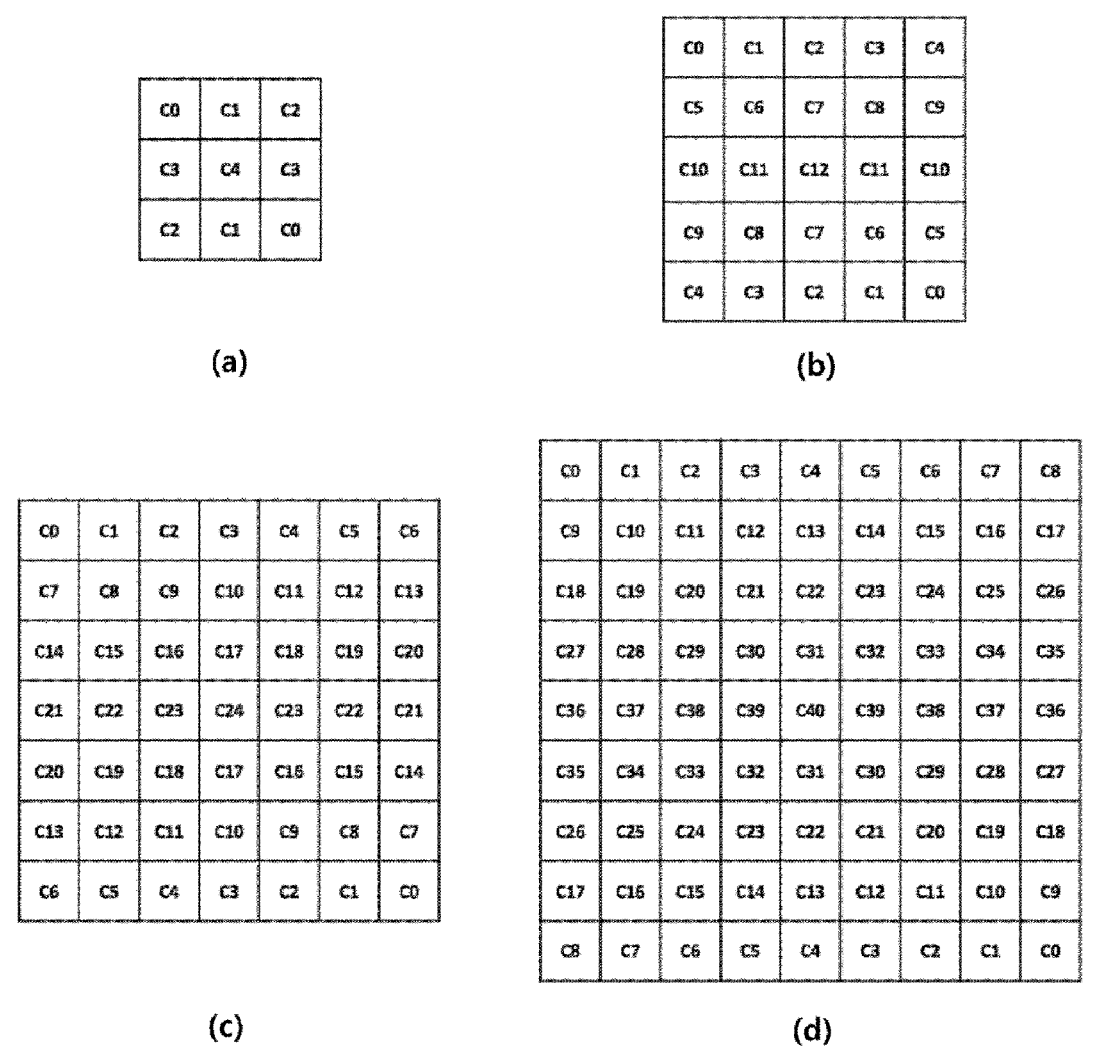

FIG. 31 shows a filter shape according to a further embodiment of the present invention. According to the above-described embodiments, since the predetermined range in which the calculation of the sample characteristics is performed is a square and the filter is diamond-shaped, a mismatch occurs between the reference area for calculation and the reference area for filtering. Thus, according to a further embodiment of the invention, in order to match the filter shape and the calculated reference area, both the filter shape and the computational reference area may be defined as all square shapes or all diamond shapes. Referring to FIG. 31, both the filter shape and the calculation reference region may be defined as a square shape. In this case, the filter may have a 3×3 square shape (i.e., FIG. 31(a)), a 5×5 square shape (i.e., FIG. 31(b)), a 7×7 square shape (i.e., FIG. 31(c)), or a 9×9 square shape (i.e., FIG. 31(d)).

Figure 32:
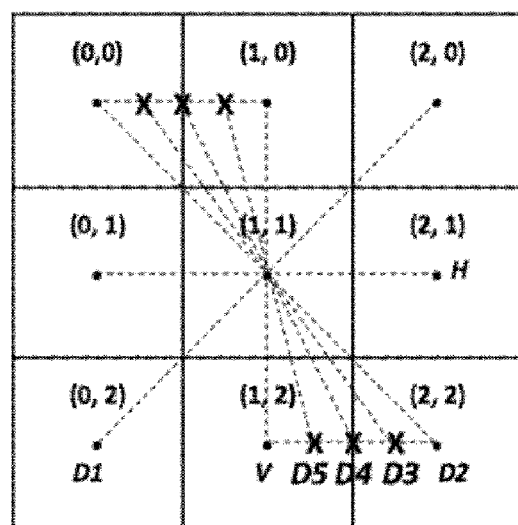
FIG. 32 shows a method for calculating sample characteristics according to a further embodiment of the present invention.

FIG. 32 shows a method for calculating sample characteristics according to a further embodiment of the present invention. In the above-described embodiments, in order to calculate the sample characteristics, the sample value change amount is performed in four directions, that is, in the horizontal direction, the vertical direction, the first diagonal direction D1, and the second diagonal direction D2. However, according to an additional embodiment of the present invention, sample characteristics may be calculated for additional directions in addition to the above four directions. Accordingly, directionality and classes may be further defined, and in-loop filtering more suitable to the characteristics of the sample and the sample range may be performed.

Referring to FIG. 32, each square represents a sample and directions added for calculating sample characteristics are indicated by D3, D4, and D5. Existing sample characteristic calculations for the four directions are performed on integer samples, but interpolated values between integer samples may be used to calculate sample properties at additional angles. According to another embodiment, sample characteristics at an additional angle may be calculated using samples at a distant location rather than samples at a continuous location. For example, to calculate the sample characteristic at position (1, 1), by using samples at positions (0, −1) and (2, 3), sample characteristic information at a new angle (e.g., D5) may be obtained.

According to another embodiment, directionality may be further diversified through gradient comparison using multiple thresholds. For example, in the process of classifying the above-mentioned directionality D, a class of directionality D may be subdivided using more threshold values. As such, as additional directions are used for calculating the sample characteristic, a geometric transformation of additional directions may also be used in the embodiment of Equation (8). For example, flips for angles D3, D4 and D5, rotations for angles other than 90 degrees, and the like may be defined. In this case, interpolation and padding processes of filter coefficients or sample values may be added.

Figure 33:
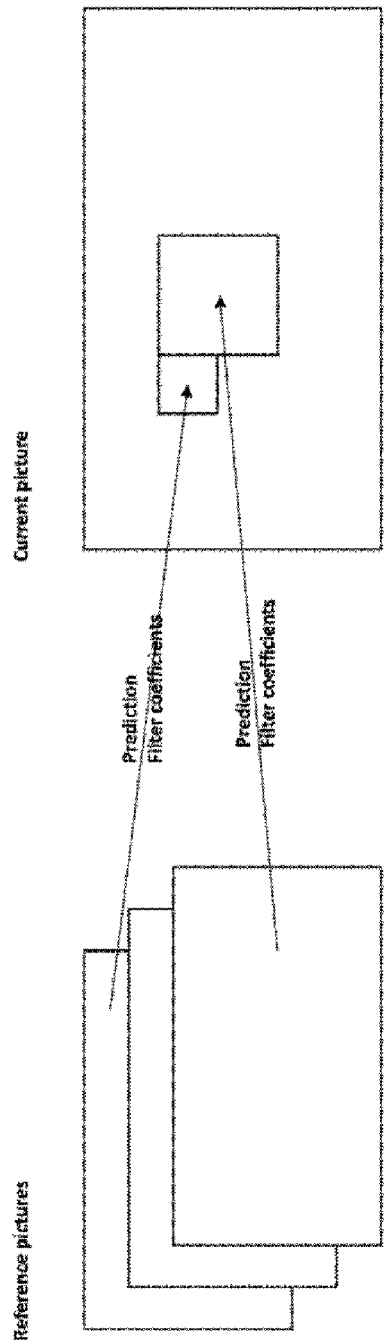
FIG. 33 shows a method for reusing filter coefficients according to a further embodiment of the present invention.

FIG. 33 shows a method for reusing filter coefficients according to a further embodiment of the present invention. As described above, filter coefficients applied to a reference picture may be reused to reduce the signaling overhead of filter coefficients. This process may be performed at the picture level. That is, it is possible to reuse filter coefficients obtained from one reference picture as a whole of the current picture. In this case, it may be difficult to use various filters in the current picture. Therefore, according to an embodiment of the present invention, filter coefficients of different reference pictures may be reused for each block. In this case, filter coefficients of a reference picture used for prediction of a corresponding block among a plurality of reference pictures may be reused. That is, filter coefficients that are reused in the current block may be obtained based on the reference picture index of the current block. Through this, signaling overhead indicating a separate reference picture index for reuse of filter coefficients may be reduced.

More specifically, the calculation result of the gradient and activity performed in the reference picture may be reused for the current block. Or, the class result calculated from the reference picture may be reused for the current block. In this case, since the reference block and the current block in the reference picture will be similar, the gradient, activity, and class result of the reference block may be used for the current block.

Figure 34:
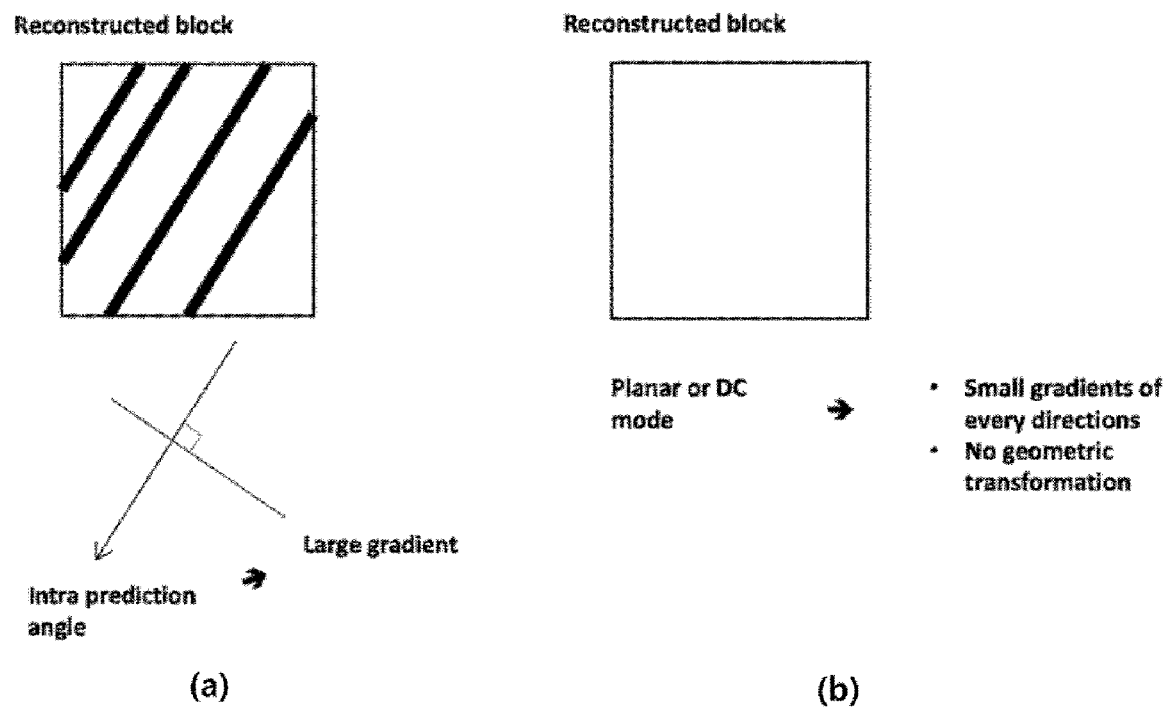
FIG. 34 shows a filtering process according to another embodiment of the present invention.

FIG. 34 shows a filtering process according to another embodiment of the present invention. According to an embodiment of the present invention, when determining directionality, class or filter coefficients, other information of the decoding process may be referenced. For example, directionality, class or filter coefficients may be determined by referring to the intra prediction mode of the current block. In addition, when applying the adaptive loop filter, some calculation of gradient, directionality, and class may be omitted by referring to the intra prediction mode of the current block.

First, referring to FIG. 34(a), the intra prediction mode of the current block may be an angular mode. In this case, it is likely that the sample values are similar in the corresponding angular direction. Therefore, when the intra prediction mode of the current block is an angular mode, it may be determined that the gradient in the direction perpendicular to the corresponding angular direction or in a direction close to the direction perpendicular to the angular direction is large. Alternatively, it may be determined that there is directionality in a direction perpendicular to the angular direction or in a direction close to a direction perpendicular to the angular direction. Therefore, the gradient, directionality, class calculation, and the like of the current block may be omitted, and based on this, which method to perform geometric transformation may be selected.

Next, referring to FIG. 34(b), the intra prediction mode of the current block may be a planar mode or a DC mode. In this case, unlike the angular mode, there is a high possibility that there is little directionality in a specific direction. Accordingly, when the intra prediction mode of the current block is a flat mode or a DC mode (i.e., the intra prediction mode is not an angular mode), it may be determined that the gradient is not large in all directions. Therefore, the gradient, directionality, class calculation, and the like of the current block may be omitted, and based on this, which method to perform geometric transformation may be selected. For example, in this case, since there is no directionality, geometric transformation may not be performed.

The filtering method according to the embodiment of FIG. 34 described above may be limited to a case where the size of the current block is a predetermined size. Also, a region to which this method is applied may be limited to a portion close to a reference sample of intra prediction. This is because the intra prediction mode in intra prediction may better represent characteristics of a portion close to a reference sample.

According to a further embodiment of the present invention, when applying an adaptive loop filter for a chroma component, it is possible to refer to adaptive loop filter information for a luma component. This is because there is a similarity between the luma component and the chroma component. In this case, the referenced information may include a filter shape, a class, and a filter coefficient. As such, signaling of the corresponding information may be reduced by referring to the information. For example, in the above-described embodiment, a filter selected from three filter shapes is used for the luma component, and one filter shape is fixedly used for the chroma component. However, according to a further embodiment of the present invention, the filter shape for the chroma component may follow the filter shape of the luma component, and in this case, the filter shape for the chroma component may not be signaled.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A non-transitory computer-readable medium storing a bitstream, the bitstream being decoded by a decoding method,
   wherein the decoding method, comprising:
   obtaining an indicator for selecting a control point motion vector set from among control point motion vector set candidates,
   wherein the control point motion vector set candidates include a first control point motion vector set, a second control point motion vector set, and a third control point motion vector set,
   wherein the first control point motion vector set includes a first control point motion vector, a second control point motion vector, and a third control point motion vector,
   wherein the second control point motion vector set includes the first control point motion vector, the second control point motion vector, and a fourth control point motion vector,
   wherein the third control point motion vector set includes the first control point motion vector and a fifth control point motion vector,
   wherein the first control point motion vector corresponds to an upper left corner of a current block,
   wherein the second control point motion vector corresponds to an upper right corner of the current block,
   wherein the third control point motion vector corresponds to a lower left corner of the current block,
   wherein the fourth control point motion vector is determined based on the first control point motion vector and the second control point motion vector,
   wherein the fifth control point motion vector is determined based on the first control point motion vector and the third control point motion vector,
   wherein the fourth control point motion vector and the fifth control point motion vector are respectively included in different control point motion vector sets;
   obtaining a motion vector of each subblock of the current block based on control point motion vectors of the control point motion vector set indicated by the indicator,
   wherein the indicator is used to obtain location information of one or more neighboring blocks referenced to derive the motion vector of each subblock of the current block among one or more neighboring blocks of the current block; and
   reconstructing the current block based on the motion vector of each subblock of the current block.

2. The non-transitory computer-readable medium storing the bitstream of claim 1,
   wherein the reconstructing the current block based on the motion vector is comprising:
   obtaining a predictor of each subblock of the current block based on the motion vector of each subblock of the current block;
   obtaining a predictor of the current block by combining the predictor of each subblock of the current block;
   reconstructing the current block based on the predictor of the current block.

3. A apparatus for decoding a video signal, the device comprising
   a processer,
   wherein the processer is configured to:
   obtain an indicator for selecting a control point motion vector set among control point motion vector set candidates,
   wherein the control point motion vector set candidates include a first control point motion vector set, a second control point motion vector set, and a third control point motion vector set,
   wherein the first control point motion vector set includes a first control point motion vector, a second control point motion vector, and a third control point motion vector,
   wherein the second control point motion vector set includes the first control point motion vector, the second control point motion vector, and a fourth control point motion vector, wherein the third control point motion vector set includes the first control point motion vector and a fifth control point motion vector, wherein the first control point motion vector corresponds to an upper left corner of a current block, wherein the second control point motion vector corresponds to an upper right corner of the current block, wherein the third control point motion vector corresponds to a lower left corner of the current block, wherein the fourth control point motion vector is determined based on the first control point motion vector and the second control point motion vector, wherein the fifth control point motion vector is determined based on the first control point motion vector and the third control point motion vector, wherein the fourth control point motion vector and the fifth control point motion vector are respectively included in different control point motion vector sets, obtain a motion vector of each subblock of the current block based on control point motion vectors of the control point motion vector set indicated by the indicator, wherein the indicator is used to obtain location information of one or more neighboring blocks referenced to derive the motion vector of each subblock of the current block among one or more neighboring blocks of the current block; and reconstruct the current block based on the motion vector of each subblock of the current block.

4. The apparatus of claim 3, wherein the processor is configured to:

obtain a predictor of each subblock of the current block based on the motion vector of each subblock of the current block;

obtain a predictor of the current block by combining the predictor of each subblock of the current block;

reconstruct the current block based on the predictor of the current block.

5. A apparatus for encoding a video signal, the device comprising a processor, wherein the processor is configured to obtain a bitstream to be decoded by a decoder using a decoding method, wherein the decoding method comprising:

obtaining an indicator for selecting a control point motion vector set from among control point motion vector set candidates, wherein the control point motion vector set candidates include a first control point motion vector set, a second control point motion vector set, and a third control point motion vector set, wherein the first control point motion vector set includes a first control point motion vector, and a second control point motion vector, and a third control point motion vector, wherein the second control point motion vector set includes the first control point motion vector, the second control point motion vector and a fourth control point motion vector, wherein the third control point motion vector set includes the first control point motion vector, and a fifth control point motion vector, wherein the first control point motion vector corresponds to an upper left corner of a current block, wherein the second control point motion vector corresponds to an upper right corner of the current block, wherein the third control point motion vector corresponds to a lower left corner of the current block, wherein the fourth control point motion vector is determined based on the first control point motion vector and the second control point motion vector, wherein the fifth control point motion vector is determined based on the first control point motion vector and the third control point motion vector, wherein the fourth control point motion vector and the fifth control point motion vector are respectively included in different control point motion vector sets;

obtaining a motion vector of each subblock of the current block based on control point motion vectors of the control point motion vector set indicated by the indicator, wherein the indicator is used to obtain location information of one or more neighboring blocks referenced to derive the motion vector of each subblock of the current block among one or more neighboring blocks of the current block; and reconstructing the current block based on the motion vector of each subblock of the current block.

6. The apparatus of claim 5, wherein the reconstructing the current block based on the motion vector is comprising:

obtaining a predictor of each subblock of the current block based on the motion vector of each subblock of the current block;

obtaining a predictor of the current block by combining the predictor of each subblock of the current block;

reconstructing the current block based on the predictor of the current block.

* * * * *